US011291029B2

(12) United States Patent
Li et al.

(10) Patent No.: US 11,291,029 B2
(45) Date of Patent: *Mar. 29, 2022

(54) SCHEDULING INFORMATION TRANSMISSION METHOD AND APPARATUS

(71) Applicant: HUAWEI TECHNOLOGIES CO., LTD., Guangdong (CN)

(72) Inventors: Zhongfeng Li, Shanghai (CN); Ning Wu, Shanghai (CN); Yongzhao Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,207

(22) Filed: Nov. 24, 2020

(65) Prior Publication Data

US 2021/0084676 A1 Mar. 18, 2021

Related U.S. Application Data

(63) Continuation of application No. 15/976,960, filed on May 11, 2018, now Pat. No. 10,869,326, which is a (Continued)

(30) Foreign Application Priority Data

Nov. 11, 2015 (CN) .......................... 201510767014.0

(51) Int. Cl.
H04W 72/12 (2009.01)
H04W 74/04 (2009.01)
H04W 72/04 (2009.01)

(52) U.S. Cl.
CPC ..... *H04W 72/1273* (2013.01); *H04W 72/042* (2013.01); *H04W 72/0493* (2013.01);
(Continued)

(58) Field of Classification Search
CPC . H04W 72/042; H04W 72/093; H04W 74/04; H04W 72/1298; H04W 72/1273;
(Continued)

(56) References Cited

U.S. PATENT DOCUMENTS

2008/0159323 A1  7/2008  Rinne et al.
2008/0310364 A1  12/2008  Lu et al.
(Continued)

FOREIGN PATENT DOCUMENTS

CN   101404526         4/2009
CN   10218625    *    4/2011 .......... H04W 72/042
(Continued)

OTHER PUBLICATIONS

Lenovo, DL physical control channels for MTC, 3GPP TSG RAN WG1 #80 R1-150550, Feb. 18, 2015, 5 pages.
(Continued)

*Primary Examiner* — Phong La
(74) *Attorney, Agent, or Firm* — Fish & Richardson P.C.

(57) ABSTRACT

The present invention provides a scheduling information transmission method and apparatus. The method includes: allocating, by a network device, a level-one dedicated channel and a level-two dedicated channel to a target terminal device; sending, by the network device, indication information of the level-one dedicated channel by using a preset first time-frequency resource; sending, by the network device, indication information of the level-two dedicated channel to the target terminal device by using the level-one dedicated channel; and sending, by the network device, dedicated scheduling information for the target terminal device to the target terminal device by using the level-two dedicated channel. Therefore, scheduling information transmission flexibility can be improved, and system performance and user experience can be improved.

21 Claims, 13 Drawing Sheets

Related U.S. Application Data continuation of application No. PCT/CN2016/094789, filed on Aug. 12, 2016.

(52) U.S. Cl.
CPC ....... *H04W 72/1289* (2013.01); *H04W 74/04* (2013.01); *H04W 72/044* (2013.01)

(58) Field of Classification Search
CPC ........... H04W 72/044; H04W 72/1289; H04W 72/0493
See application file for complete search history.

(56) References Cited

U.S. PATENT DOCUMENTS

| | | | |
|---|---|---|---|
| 2010/0173660 A1 | 7/2010 | Liu et al. | |
| 2012/0120912 A1 | 5/2012 | Liu et al. | |
| 2013/0016686 A1 | 1/2013 | Li et al. | |
| 2013/0250880 A1 | 9/2013 | Liao et al. | |
| 2014/0126491 A1 | 5/2014 | Ekpenyong et al. | |
| 2014/0192753 A1 | 7/2014 | Jang et al. | |
| 2014/0211730 A1 | 7/2014 | Seo et al. | |
| 2014/0254420 A1 | 9/2014 | Kim et al. | |
| 2014/0341180 A1* | 11/2014 | Liu .................. | H04L 5/0051 370/330 |
| 2015/0305059 A1 | 10/2015 | Li et al. | |
| 2018/0249510 A1* | 8/2018 | Lee .................. | H04W 74/0833 |
| 2019/0045490 A1 | 2/2019 | Davydov et al. | |

FOREIGN PATENT DOCUMENTS

| | | |
|---|---|---|
| CN | 102186251 | 9/2011 |
| CN | 102858014 | 1/2013 |
| JP | 2014529940 | 11/2014 |
| JP | 2015501595 | 1/2015 |
| JP | 2015518305 | 6/2015 |

OTHER PUBLICATIONS

R1-120998 Huawei, HiSilicon, "UE-specific search space for ePDCCH", 3GPP TSG RAN WG1 Meeting #68bis, JeJu, Korea, Mar. 26-30, 2012, total 5 pages.

R1-156462 Huawei, HiSilicon, "NB-IOT-downlink physical layer concept description", 3GPP TSG RAN WG1 Meeting #83, Anaheim, USA, Nov. 15-22, 2015, total 11 pages.

* cited by examiner

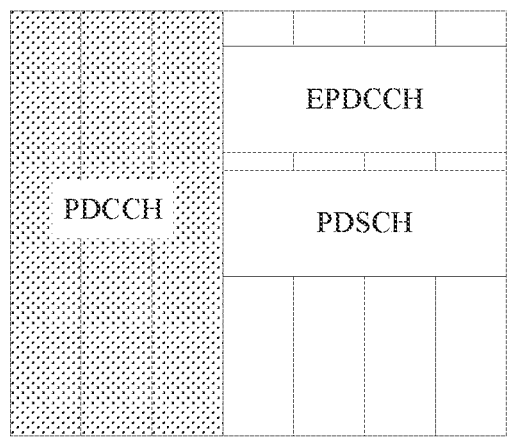

A network device allocates a level-one dedicated channel and a level-two dedicated channel to a target terminal device — S110

The network device sends indication information of the level-one dedicated channel by using a preset first time-frequency resource — S120

The network device sends indication information of the level-two dedicated channel to the target terminal device by using the level-one dedicated channel — S130

The network device sends dedicated scheduling information for the target terminal device to the target terminal device by using the level-two dedicated channel — S140

A target terminal device receives, by using a preset first time-frequency resource, indication information that is of a level-one dedicated channel and that is sent by a network device — S210

The target terminal device determines the level-one dedicated channel according to the indication information of the level-one dedicated channel — S220

The target terminal device receives, by using the level-one dedicated channel, indication information that is of a level-two dedicated channel and that is sent by the network device — S230

The target terminal device determines the level-two dedicated channel according to the indication information of the level-two dedicated channel — S240

The target terminal device receives, by using the level-two dedicated channel, dedicated scheduling information that is sent by the network device and that is for the target terminal device — S250

FIG. 12

SCHEDULING INFORMATION TRANSMISSION METHOD AND APPARATUS

CROSS-REFERENCE TO RELATED APPLICATIONS

This application is a continuation of U.S. patent application Ser. No. 15/976,960, filed on May 11, 2018, which is a continuation of International Application No. PCT/CN2016/094789, filed on Aug. 12, 2016, which claims priority to Chinese Patent Application No. 201510767014.0, filed on Nov. 11, 2015. All of the afore-mentioned patent applications are hereby incorporated by reference in their entireties.

TECHNICAL FIELD

The present invention relates to the communications field, and more specifically, to a scheduling information transmission method and apparatus.

BACKGROUND

Currently, in a known communications technology, a physical downlink control channel (PDCCH) is used to carry scheduling information of a terminal device, and a physical downlink data channel (PDSCH) is used to carry downlink data of UE. In addition, the PDCCH and the PDSCH multiplex system bandwidth by means of time division multiplexing.

To resolve problems such as a limited support of interference coordination and a limited channel capacity of the PDCCH, a solution in which an enhanced downlink control channel (EPDCCH) is used to transmit scheduling information is provided.

As shown in FIG. 1, in the prior art, because a PDCCH and an EPDCCH coexist, a start symbol of the EPDCCH is limited by the PDCCH, and use of the EPDCCH is affected because of complex design. Consequently, transmission scheduling timeliness and flexibility are affected.

SUMMARY

Embodiments of the present invention provide a scheduling information transmission method and apparatus, so as to improve, scheduling information transmission flexibility, and improve system performance and user experience.

According to a first aspect, a scheduling information transmission method is provided, and is performed in a communications system that includes at least two levels of dedicated channels used for downlink control, where the dedicated channels at the levels are corresponding to different time-frequency resources, the dedicated channel is detected only by a terminal device to which the dedicated channel is allocated, and the method includes: allocating, by a network device, a level-one dedicated channel and a level-two dedicated channel to a target terminal device; sending, by the network device, indication information of the level-one dedicated channel by using a preset first time-frequency resource; sending, by the network device, indication information of the level-two dedicated channel to the target terminal device by using the level-one dedicated channel; or sending, by the network device, indication information of a third time-frequency resource to the target terminal device by using the level-one dedicated channel, and sending indication information of the level-two dedicated channel to the target terminal device by using the third time-frequency resource, where the third time-frequency resource belongs to a time-frequency resource of a downlink data channel PDSCH; and sending, by the network device, dedicated scheduling information for the target terminal device to the target terminal device by using the level-two dedicated channel.

With reference to the first aspect, in a first implementation of the first aspect, the allocating, by the network device, a level-one dedicated channel and a level-two dedicated channel to the target terminal device includes: allocating the level-one dedicated channel or the level-two dedicated channel to the target terminal device according to a delay requirement of a service to be accessed by the target terminal device.

With reference to the first aspect and the foregoing implementation, in a second implementation of the first aspect, the communications system further includes a common channel, the common channel has a time-frequency resource different from a time-frequency resource of the dedicated channel, the common channel is detected by all terminal devices in the communications system, and the method further includes: sending, by the network device, indication information of the common channel by using a preset second time-frequency resource; and sending, by the network device, a common message by using the common channel; or sending, by the network device, indication information of a fourth time-frequency resource by using the common channel, and sending a common message by using the fourth time-frequency resource, where the fourth time-frequency resource belongs to a time-frequency resource of the downlink data channel PDSCH, and the common message includes at least one of a random access response message, a paging message, or a system message.

According to a second aspect, a scheduling information transmission method is provided, and is performed in a communications system that includes at least two levels of dedicated channels used for downlink control, where the dedicated channels at the levels are corresponding to different time-frequency resources, the dedicated channel is detected only by a terminal device to which the dedicated channel is allocated, and the method includes: receiving, by a target terminal device by using a preset first time-frequency resource, indication information that is of the level-one dedicated channel and that is sent by a network device; determining, by the target terminal device, the level-one dedicated channel according to the indication information of the level-one dedicated channel; receiving, by the target terminal device by using the level-one dedicated channel, indication information that is of the level-two dedicated channel and that is sent by the network device; or receiving, by the target terminal device by using the level-one dedicated channel, indication information that is of a third time-frequency resource and that is sent by the network device, and receiving, by using the third time-frequency resource, indication information that is of the level-two dedicated channel and that is sent by the network device, where the third time-frequency resource belongs to a time-frequency resource of a downlink data channel PDSCH; determining, by the target terminal device, the level-two dedicated channel according to the indication information of the level-two dedicated channel; and receiving, by the target terminal device by using the level-two dedicated channel, dedicated scheduling information that is sent by the network device and that is for the target terminal device.

With reference to the second aspect, in a first implementation of the second aspect, the level-one dedicated channel or the level-two dedicated channel is allocated by the network device according to a delay requirement of a service to be accessed by the target terminal device.

With reference to the second aspect and the foregoing implementation, in a second implementation of the second aspect, the communications system further includes a common channel, the common channel has a time-frequency resource different from a time-frequency resource of the dedicated channel, the common channel is detected by all terminal devices in the communications system, and the method further includes: receiving, by the target terminal device by using a preset second time-frequency resource, indication information that is of the common channel and that is sent by the network device; and receiving, by the target terminal device by using the common channel, a common message sent by the network device; or receiving, by the target terminal device by using the common channel, indication information that is of a fourth time-frequency resource and that is sent by the network device, and receiving, by using the fourth time-frequency resource, a common message sent by the network device, where the fourth time-frequency resource belongs to a time-frequency resource of the downlink data channel PDSCH, and the common message includes at least one of a random access response message, a paging message, or a system message.

According to a third aspect, a scheduling information transmission apparatus is provided, and is configured in a communications system that includes at least two levels of dedicated channels used for downlink control, where the dedicated channels at the levels are corresponding to different time-frequency resources, the dedicated channel is detected only by a terminal device to which the dedicated channel is allocated, and the apparatus includes: an allocation unit, configured to allocate a level-one dedicated channel and a level-two dedicated channel to a target terminal device; and a sending unit, configured to: send indication information of the level-one dedicated channel by using a preset first time-frequency resource; send indication information of the level-two dedicated channel to the target terminal device by using the level-one dedicated channel; or send indication information of a third time-frequency resource to the target terminal device by using the level-one dedicated channel, and send indication information of the level-two dedicated channel to the target terminal device by using the third time-frequency resource, where the third time-frequency resource belongs to a tune-frequency resource of a downlink data channel PDSCH; and send dedicated scheduling information for the target terminal device to the target terminal device by using the level-two dedicated channel.

With reference to the third aspect, in a first implementation of the third aspect, the allocation unit is specifically configured to allocate the level-one dedicated channel or the level-two dedicated channel to the target terminal device according to a delay requirement of a service to be accessed by the target terminal device.

With reference to the third aspect and the foregoing implementation, in a second implementation of the third aspect, the communications system further includes a common channel, the common channel has a time-frequency resource different from a time-frequency resource of the dedicated channel, the common channel is detected by all terminal devices in the communications system, and the sending unit is further configured to: send indication information of the common channel by using a preset second time-frequency resource; and send a common message by using the common channel; or send indication information of a fourth time-frequency resource by using the common channel, and send a common message by using the fourth time-frequency resource, where the fourth time-frequency resource belongs to a time-frequency resource of the downlink data channel PDSCH, and the common message includes at least one of a random access response message, a paging message, or a system message.

According to a fourth aspect, a scheduling information transmission apparatus is provided, and is configured in a communications system that includes at least two levels of dedicated channels used for downlink control, where the dedicated channels at the levels are corresponding to different time-frequency resources, the dedicated channel is detected only by a terminal device to which the dedicated channel is allocated, and the apparatus includes: a receiving unit, configured to receive, by using a preset first time-frequency resource, indication information that is of the level-one dedicated channel and that is sent by a network device; and a determining unit, configured to determine the level-one dedicated channel according to the indication information of the level-one dedicated channel, where the receiving unit is further configured to receive, by using the level-one dedicated channel, indication information that is of the level-two dedicated channel and that is sent by the network device; or the receiving unit is further configured to: receive, by using the level-one dedicated channel, indication information that is of a third time-frequency resource and that is sent by the network device, and receive, by using the third time-frequency resource, indication information that is of the level-two dedicated channel and that is sent by the network device, where the third time-frequency resource belongs to a time-frequency resource of a downlink data channel PDSCH; the determining unit is further configured to determine the level-two dedicated channel according to the indication information of the level-two dedicated channel; and the receiving unit is further configured to receive, by using the level-two dedicated channel, dedicated scheduling information that is sent by the network device and that is for the apparatus.

With reference to the fourth aspect, in a first implementation of the fourth aspect, the level-one dedicated channel or the level-two dedicated channel is allocated by the network device according to a delay requirement of a service to be accessed by the apparatus.

With reference to the fourth aspect and the foregoing implementation, in a second implementation of the fourth aspect, the communications system further includes a common channel, the common channel has a time-frequency resource different from a time-frequency resource of the dedicated channel, the common channel is detected by all terminal devices in the communications system, and the receiving unit is further configured to receive, by using a preset second time-frequency resource, indication information that is of the common channel and that is sent by the network device; the determining unit is further configured to determine the common channel according to the indication information of the common channel; and the receiving unit is further configured to receive, by using the common channel, a common message sent by the network device; or the receiving unit is further configured to: receive, by using the common channel, indication information that is of a fourth time-frequency resource and that is sent by the network device, and receive, by using the fourth time-frequency resource, a common message sent by the network device, where the fourth time-frequency resource belongs to a time-frequency resource of the downlink data channel PDSCH, and the common message includes at least one of a random access response message, a paging message, or a system message.

According to the scheduling information transmission method and apparatus in the embodiments of the present invention, the at least two levels of dedicated channels are configured, and when resource scheduling needs to be performed for the terminal device, indication information of a time-frequency resource of the level-one dedicated channel is sent by using the first time-frequency resource used to transmit system information, so that indication information of a time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel, and start symbols of the dedicated channels are not limited by a PDCCH. Therefore, scheduling information transmission flexibility can be improved, and system performance and user experience can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic diagram of a manner of multiplexing system bandwidth by a PDCCH, a PDSCH, and an EPDCCH in the prior art;

FIG. 2 is a schematic flowchart of a scheduling information transmission method according to an embodiment of the present invention;

FIG. 12 is a schematic flowchart of a scheduling information transmission method according to another embodiment of the present invention;

DESCRIPTION OF EMBODIMENTS

Figure 3:
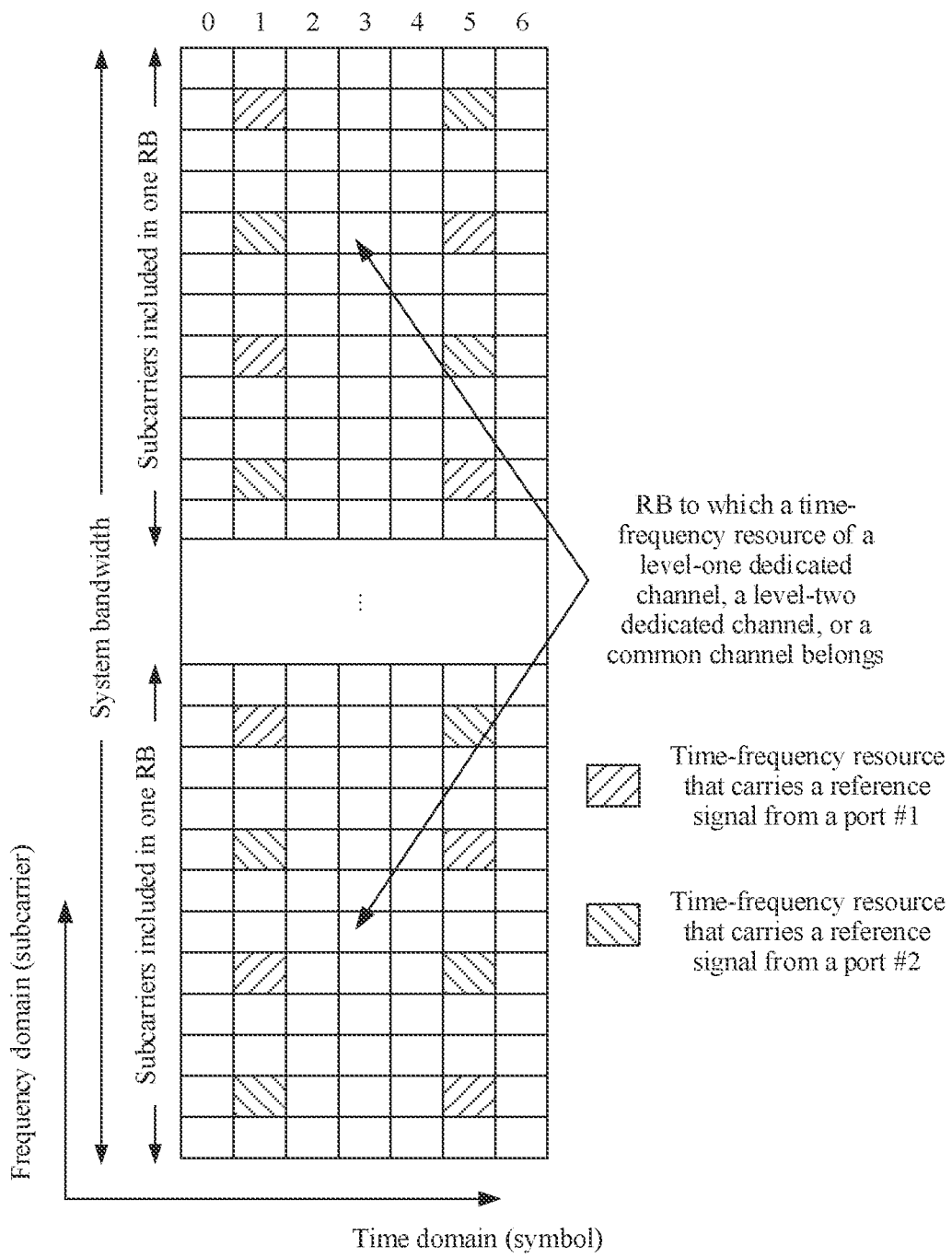
FIG. 3 is a schematic diagram of an example of a distribution manner of a time-frequency resource of a level-one dedicated channel, a level-two dedicated channel, or a common channel according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. Both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In the embodiments of the present invention, the computer includes a hardware layer, an operating system layer that runs above the hardware layer, and an application layer that runs above the operating system layer. The hardware layer includes hardware such as a CPU, a memory management unit (MMU), and a memory (also referred to as a storage). The operating system may be one or more computer operating systems that implement service processing by, using a process, for example, a Linux system, a Unix system, an Android system, an iOS system, or a Windows system, and this is not particularly limited in the present invention. The application layer includes applications such as a browser, an address book, word processing software, and instant messaging software. It should be understood that the foregoing enumerated computer devices are merely examples for description, and this is not particularly limited in the present invention.

Solutions in the embodiments of the present invention may be applied to an existing cellular communications system, for example, a system such as a Global System for Mobile Communications (GSM), a Wideband Code Division Multiple Access (WCDMA) system, a Long Term Evolution (LTE) system, or a Code Division Multiple Access (CDMA) system. Supported communication is mainly voice and data communication. Generally, a quantity of connections supported by a conventional base station is limited and easily implemented.

Optionally, a network device is a base station, and a terminal device is user equipment.

In the present invention, the embodiments are described with reference to a terminal device. The terminal device may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a Session Initiation Protocol (SIP) phone, a wireless local loop (WLL) station, a personal digital assistant (PDA), a handheld device that has a wireless communication function, a computing device, or another processing device that is connected to a wireless modem, an in-vehicle device, a wearable device, or a terminal device in a future 5G network.

In addition, in the present invention, the embodiments are described with reference to a network device. The network device may be a device configured to communicate with a mobile device. The network device may be an access point (AP) in a WLAN, or a base transceiver station (BTS) in GSM or CDMA, or may be a NodeB (NB) in WCDMA, or may be an evolved NodeB (eNB or eNodeB) in LIE, a relay station, an access point, an in-vehicle device, a wearable device, or a network device in a future 5G network.

In addition, aspects or features of the present invention may be implemented as a method, an apparatus or a product that uses standard programming and/or engineering technologies. The term "product" used in this application covers a computer program that can be accessed from any computer readable component, carrier or medium. For example, a computer readable medium may include but is not limited to a magnetic storage component (for example, a hard disk, a floppy disk, or a magnetic tape), an optical disc, for example, a compact disk (CD) or a digital versatile disk (DVD), a smart card, and a flash memory component, for example, an erasable programmable read-only memory (EPROM). In addition, various storage media described in this specification may indicate one or more devices and/or other machine-readable media configured to store information. The term "machine-readable media" may include but is not limited to a radio channel, and various other media that can store, contain and/or carry an instruction and/or data.

FIG. 2 is a schematic flowchart of a scheduling information transmission method 100 according to an embodiment of the present invention that is described from a perspective of a network device. The method 100 is performed in a communications system that includes at least two levels of dedicated channels used for downlink control. The dedicated channels at the levels are corresponding to different time-frequency resources. The dedicated channel is detected only by a terminal device to which the dedicated channel is allocated. As shown in FIG. 2, the method 100 includes the following steps.

S110. The network device allocates a level-one dedicated channel and a level-two dedicated channel to a target terminal device.

S120. The network device sends indication information of the level-one dedicated channel by using a preset first time-frequency resource.

S130. The network device sends indication information of the level-two dedicated channel to the target terminal device by using the level-one dedicated channel.

Alternatively, the network device sends indication information of a third time-frequency resource to the target terminal device by using the level-one dedicated channel, and sends indication information of the level-two dedicated channel to the target terminal device by using the third time-frequency resource, where the third time-frequency resource belongs to a time-frequency resource of a downlink data channel PDSCH.

S140. The network device sends dedicated scheduling information for the target terminal device to the target terminal device by using the level-two dedicated channel.

In this embodiment of the present invention, the dedicated scheduling information for the terminal device is transmitted by using the at least two levels of dedicated channels used for downlink control.

The "dedicated channel" herein is a channel detected only by a terminal device to which the dedicated channel is allocated. Without loss of generality, for example, if a dedicated channel #1 is allocated by the network device to a terminal device #1 (that is, an example of the target terminal device), the network device may deliver, to the terminal device #1, indication information of a time-frequency resource (which may also be referred to as "search space") corresponding to the dedicated channel #1. Therefore, the terminal device #1 can perform detection (or a search) on the time-frequency resource corresponding to the dedicated channel #1, to obtain information delivered by the network device, for example, dedicated scheduling information for the terminal device #1. In addition, a terminal device other than the terminal device #1 in the system does not perform detection on the time-frequency resource corresponding to the dedicated channel #1.

In addition, the "dedicated scheduling information" is information that is delivered to the terminal device when the network device needs to perform resource scheduling for the terminal device and that is used for the resource scheduling. By way of example, and not limitation, the "dedicated scheduling information for the terminal device #1" may include information that needs to be transmitted to the terminal device #1 in a dedicated search area of an EPDCCH or a PDCCH in the prior art, for example, allocation information for downlink scheduling of the terminal device #1, or grant information for uplink scheduling of the terminal device #1.

In addition, in this embodiment of the present invention, the dedicated scheduling information is delivered by using the at least two levels of dedicated channels.

The level-two dedicated channel is used to deliver the dedicated scheduling information, and the level-one dedicated channel is used to deliver indication information used to indicate a time-frequency resource (or search space) of the level-two dedicated channel.

Without loss of generality, the dedicated scheduling information for the terminal device #1 is carried on a level-two dedicated channel (for ease of understanding and description, denoted as a dedicated channel #2 below) allocated to the terminal device #1.

The network device may deliver, by using a level-one dedicated channel (for example, the dedicated channel #1) that is allocated to the terminal device #1, indication information used to indicate a time-frequency resource of the dedicated channel #2.

For example, the network device may directly deliver the indication information (for ease of understanding and differentiation, denoted as indication information #1 below) of the time-frequency resource of the dedicated channel #2 by using the dedicated channel #1.

Alternatively, the network device may deliver indication information (for ease of understanding and differentiation, denoted as indication information #2 below) of a time-frequency resource of a PDSCH by using the dedicated channel #1, for example, by using a downlink control information (DCI, Downlink Control Information) message, and deliver indication information #1 by using the time-frequency resource that is of the PDSCH and that is indicated by the indication information #2.

Therefore, the terminal device #1 can directly or indirectly obtain the indication information #1 by using the dedicated channel #1, determine the dedicated channel #2 (which is specifically the time-frequency resource of the dedicated channel #2) according to the indication information #1, and obtain the dedicated scheduling information for the terminal device #1 from the time-frequency resource of the dedicated channel #2.

In addition, the network device may deliver indication information of a time-frequency resource of an EPDCCH #1 to the terminal device #1 according to a preset time-frequency resource (that is, an example of the first time-frequency resource) used to transmit system information (for example, a MIB). Therefore, the terminal device #1 can obtain the indication information of the time-frequency resource of the dedicated channel #1 by using the preset time-frequency resource, further determine the time-frequency resource of the dedicated channel #1, and obtain the indication information of the time-frequency resource of the dedicated channel #2 from the time-frequency resource of the dedicated channel #1 by using the dedicated channel #1.

It may be learned that in a process of transmitting the dedicated scheduling information for the terminal device #1, the time-frequency resource used to transmit the system information is occupied only when the indication information of the time-frequency resource of the dedicated channel #1 is transmitted. Therefore, scheduling information transmission flexibility can be improved, and system performance and user experience can be improved.

Optionally, the dedicated channel is a dedicated EPDCCH.

Specifically, in this embodiment of the present invention, EPDCCHs in the communications system may be classified into a dedicated EPDCCH and a common EPDCCH (the common EPDCCH is subsequently described in detail). The "dedicated EPDCCH" is an EPDCCH that is detected only by a terminal device to which the dedicated EPDCCH is allocated. For example, if a dedicated EPDCCH #1 (for ease of understanding and description, simply referred to as an EPDCCH #1 below) is allocated by the network device to the terminal device #1, the network device may deliver, to the terminal device #1, indication information of a time-frequency resource (which may also be referred to as "search space") corresponding to the EPDCCH #1. Therefore, the terminal device #1 can perform detection (or a search) on the time-frequency resource corresponding to the EPDCCH #1, to obtain information delivered by the network device, for example, the dedicated scheduling information for the terminal device #1. In addition, a terminal device other than the terminal device #1 in the system does not perform detection on the time-frequency resource corresponding to the EPDCCH #1.

It should be understood that the foregoing enumerated solution in which the EPDCCH is used as the dedicated channel is merely an example for description, and the present invention is not limited thereto. For example, a future enhanced downlink control channel (FEPDCCH) or a dedicated PDCCH may be used as the dedicated channel.

For ease of understanding and description, an example in which the EPDCCH is used as the dedicated channel is used to describe in detail a specific process of the method 100 below.

Without loss of generality, a process of delivering control information to the terminal device #1 (that is, an example of the target terminal device) is used as an example to describe the method 100 in detail.

The network device may determine a time-frequency resource (for ease of understanding and differentiation, denoted as a time-frequency resource A below) of a level-one EPDCCH (that is, an example of the level-one dedicated channel) from time-frequency resources provided by the system.

Optionally, that the network device allocates a level-one dedicated EPDCCH to a target terminal device includes:

the network device determines a size of the time-frequency resource of the level-one dedicated EPDCCH according to a quantity of terminal devices that need scheduling.

Specifically, in this embodiment of the present invention, the level-one EPDCCH the at least two levels of EPDCCHs may be considered as an EPDCCH that is allocated to all terminal devices that currently need scheduling. Alternatively, the time-frequency resource of the level-one EPDCCH is used as search space that carries all terminal devices that currently need scheduling.

In this case, the network device may determine the size of the time-frequency resource A according to the quantity of terminal devices that currently need scheduling. For example, if the quantity of terminal devices that currently need scheduling is relatively large, a quantity of level-two EPDCCHs that need to be allocated to the terminal devices is also relatively large, and correspondingly, a quantity of indication information of time-frequency resources of the level-two EPDCCHs (or time-frequency resources that are used to carry indication information of time-frequency resources of the level-two EPDCCHs and that are of a PDSCH) is also relatively large. Therefore, a relatively large quantity of time-frequency resources (such as symbols, subcarriers, or resource blocks) may be allocated and used as the time-frequency resource A.

The time-frequency resource of the level-one EPDCCH is allocated according to the quantity of terminal devices that currently need scheduling, thereby avoiding a case in which when there are a relatively small quantity of terminal devices that need scheduling, a relatively large quantity of time-frequency resources are still occupied for resource scheduling, and avoiding a waste of system resources.

It may be learned from the foregoing description that the time-frequency resource (for ease of understanding and differentiation, denoted as a time-frequency resource $A_1$ below) of the EPDCCH #1 may be considered as a part of the time-frequency resource A.

By way of example, and not limitation, the network device may indicate, according to a quantity N of terminal devices (for ease of understanding and differentiation, denoted as a terminal device #1 to a terminal device #N below) that currently need scheduling, a length or a size of indication information (that is, the indication information #1) of a time-frequency resource of a level-two EPDCCH allocated to each terminal device, or a length or a size of indication information (that is, the indication information #2) of a time-frequency resource that is of a PDSCH and that is used to carry the indication information #1, and divide the time-frequency resource A into X sub-time-frequency resources (for ease of understanding and differentiation, denoted as a sub-time-frequency resource #$A_1$ to a sub-time-frequency resource #$A_x$), where X≥N. In addition, the terminal device #1 to the terminal device #N are in a one-to-one correspondence with the sub-time-frequency resource to the sub-time-frequency resource #$A_N$, that is, each sub-time-frequency resource is allocated to a corresponding terminal device.

In this case, because the indication information #1 or the indication information #2 allocated to a plurality of terminal devices is carried in the time-frequency resource A, each terminal device needs to determine indication information that needs to be obtained.

Therefore, for example, when the network device delivers the indication information #1 or the indication information 112 to the terminal device #1 by using the dedicated EPDCCH #1, the network device may add related information of the terminal device #1 to a sub-time-frequency resource (that is, the time-frequency resource $A_1$) corresponding to the terminal device #1. Therefore, after learning of a location of the time-frequency resource A, the terminal device #1 may perform detection on the time-frequency resource A, use, as the time-frequency resource $A_1$, a sub-time-frequency resource that carries the related information of the terminal device #1, and receive, on the time-frequency resource $A_1$, the indication information #1 (that is, indication information of a time-frequency resource of an EPDCCH #2) or the indication information #2 (that is, indication information of a time-frequency resource that is of a PDSCH and that is used to carry the indication information #1) sent by the network device to the terminal device #1.

For another example, the indication information #1 or the indication information #2 may include a resource indication part (a part that carries indication information of a time-frequency resource) and a device-related information part (a part that carries related information of a terminal device). Therefore, after learning of a location of the time-frequency resource A, the terminal device #1 may perform detection on the time-frequency resource A, and consider, as the indication information #1 or the indication information #2 sent by the network device to the terminal device #1, indication information that carries related information of the terminal device #1.

For another example, the network device may obtain a preset mapping rule. The mapping rule may indicate a one-to-one correspondence between the sub-time-frequency resource #$A_1$ to the sub-time-frequency resource #$A_N$ and related information of the terminal device #1 to the terminal device #N. In addition, the terminal device may obtain a same or a corresponding mapping rule. Therefore, for example, for the terminal device #1, the network device and the terminal device #1 can determine a same sub-time-frequency resource from the time-frequency resource A, as the time-frequency resource $A_1$, and receive, on the time-frequency resource $A_1$, the indication information #1 or the indication information #2 sent by the network device to the terminal device #1.

By way of example, and not limitation, the related information of the terminal device may include a device identifier of the terminal device. It should be understood that the foregoing enumerated related information of the terminal device #1 is merely an example for description, and the present invention is not limited thereto. Other information that can uniquely indicate the terminal device falls within the protection scope of the present invention provided that the network device and each terminal device use same or corresponding information. For example, the related information of the terminal device may further include a Media Access Control (MAC) address or an Internet Protocol (IP) address of the terminal device.

It should be understood that the foregoing enumerated method for allocating the level-one EPDCCH or the method for determining the time-frequency resource of the level-one EPDCCH is merely an example for description, and the present invention is not limited thereto. A maximum quantity of terminal devices for which the network device can perform scheduling within a scheduling period may be determined according to a capability of the network device, and during each time of allocation, a fixed quantity of time-frequency resources are allocated to the level-one EPDCCH according to the maximum quantity and a size or a length of indication information (that is, the indication information #1 or the indication information #2) of each level-two EPDCCH provided that the time-frequency resource of the level-one EPDCCH can meet a requirement of transmitting the indication information (that is, the indication information #1 or the indication information #2) of the level-two EPDCCH.

Optionally, the terminal device detects only one of the level-one EPDCCH or the level-two EPDCCH at one moment.

Specifically, in this embodiment of the present invention, before learning of, by using the time-frequency resource a time-frequency resource (for ease of understanding and differentiation, denoted as a time-frequency resource B below) allocated by the network device to a level-two EPDCCH of the terminal device #1, the terminal device #1 cannot detect or search for the level-two EPDCCH, and detects only the level-one EPDCCH.

After the terminal device #1 learns of the time-frequency resource B by using the time-frequency resource. $A_1$, the terminal device #1 may perform a search or detection only on the time-frequency resource B, and stop a search and detection for the level-one EPDCCH performed on the time-frequency resource $A_1$.

Correspondingly, the network device may release the time-frequency resource $A_1$ and re-allocate the time-frequency resource $A_1$ to another terminal device.

A configuration manner of the time-frequency resource of the level-one EPDCCH (that is, an example of the level-one dedicated channel) is described in detail below.

Optionally, a time-frequency resource of the level-one dedicated channel belongs to at least two resource blocks RBs.

Specifically, the time-frequency resource of the level-one EPDCCH (that is, an example of the level-one dedicated channel) may be allocated on a basis of a resource block (RB), that is, the time-frequency resource of the level-one EPDCCH may belong to at least two RBs. It should be noted that "belonging to at least two RBs" means that the time-frequency resource of the level-one EPDCCH may include all time-frequency resources of the at least two RBs, or may include some time-frequency resources of the at least two RBs, for example, include a half quantity of subcarriers or symbols of each RB.

Optionally, the at least two RBs to which the time-frequency resource of the level-one dedicated channel belongs are discontinuous.

Figure 4:
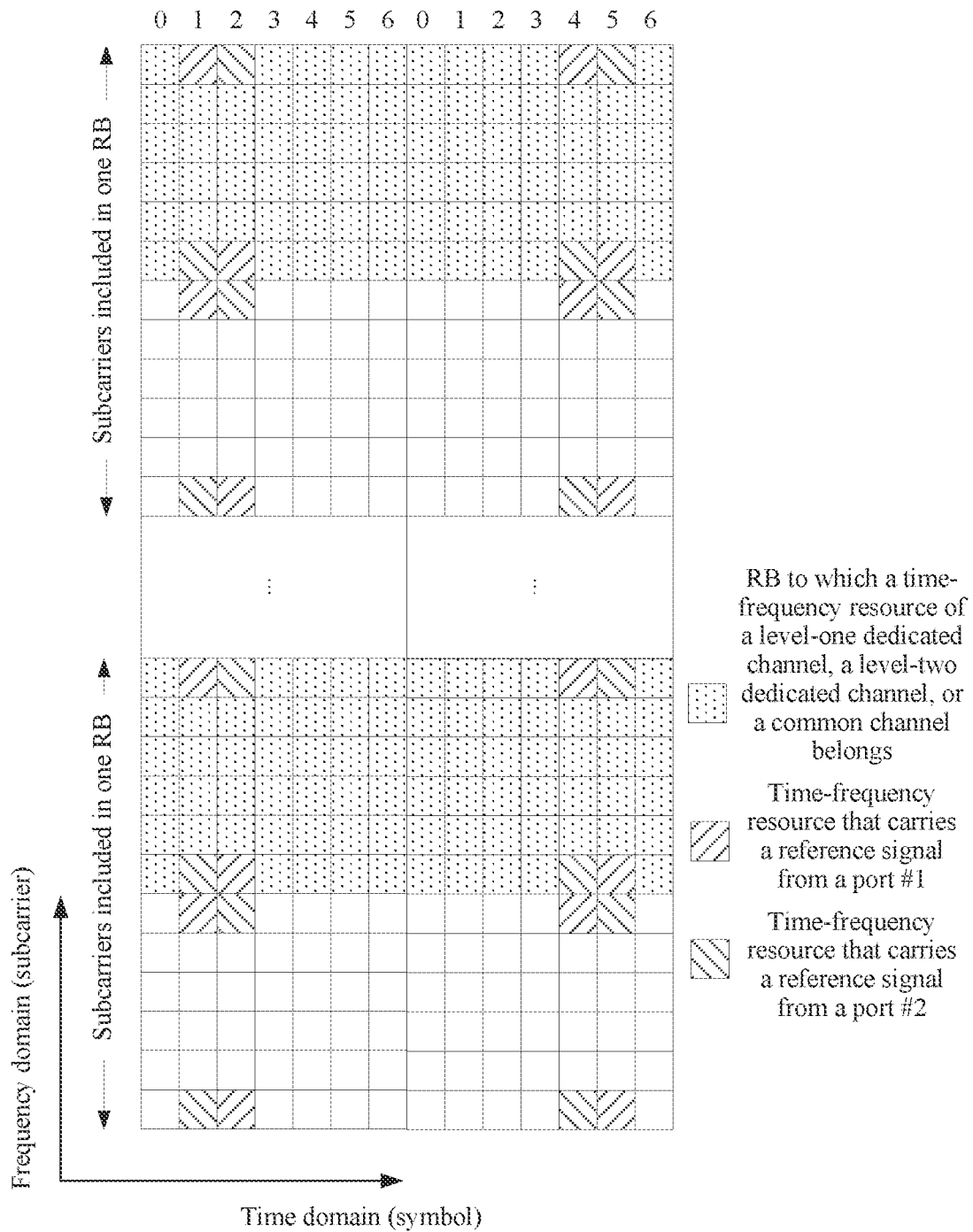
FIG. 4 is a schematic diagram of another example of a distribution manner of a time-frequency resource of a level-one dedicated channel, a level-two dedicated channel, or a common channel according to an embodiment of the present invention.

Specifically, FIG. 4 is a schematic diagram of another example of a distribution manner of the time-frequency resource of the level-one EPDCCH. As shown in FIG. 4, the time-frequency resource of the level-one EPDCCH may be carried in at least two RBs that are not adjacent to each other. Therefore, a transmission diversity gain can be improved.

Optionally, in a frequency domain, the time-frequency resource of the level-one dedicated channel is located at two ends of preset bandwidth.

Specifically, FIG. 3 shows an example of a distribution manner of the time-frequency resource of the level-one EPDCCH. As shown in FIG. 3, the time-frequency resource of the level-one EPDCCH may belong to at least two RBs at the two ends of the preset bandwidth.

In addition, in this embodiment of the present invention, the preset bandwidth is bandwidth that is preset by the network device and the terminal device in advance. By way of example, and not limitation, the preset bandwidth may be system bandwidth used by the communications system.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Specifically, the time-frequency resource of the level-one EPDCCH may belong to at least two RBs, and only some (for example, a half quantity of) subcarriers in the at least two RBs are used as the time-frequency resource of the level-one EPDCCH. In addition, when two RBs to which the time-frequency resource of the level-one EPDCCH may belong are adjacent, subcarriers that are in the two RBs and that are used as the time-frequency resource of the level-one EPDCCH are discontinuous.

Optionally, the time-frequency resource of the level-one dedicated channel includes the first K symbols in a same transmission time interval TTI, where K≥1.

Figure 5:
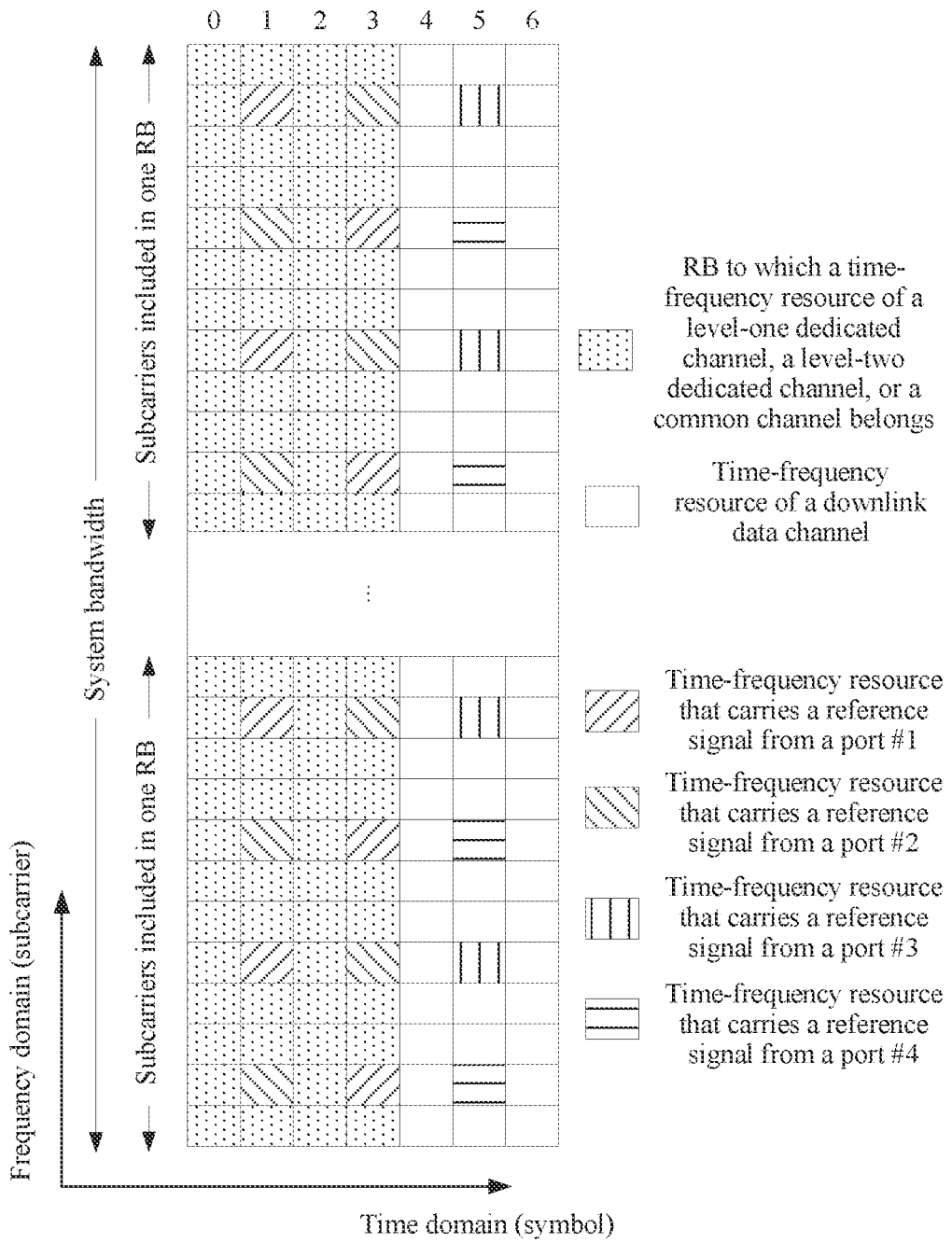
FIG. 5 is a schematic diagram of still another example of a distribution manner of a time-frequency resource of a level-one dedicated channel, a level-two dedicated channel, or a common channel according to an embodiment of the present invention.

Specifically, FIG. 5 is a schematic diagram of another example of a distribution manner of the time-frequency resource of the level-one EPDCCH. As shown in FIG. 5, the time-frequency resource of the level-one EPDCCH may be the first K symbols of an RB to which the time-frequency resource of the level-one EPDCCH belongs, and the remaining symbol of the RB may be used as, for example, a time-frequency resource of a PDSCH.

It should be understood that the foregoing enumerated function of a symbol other than a symbol that is in an RB and that is used as the time-frequency resource of the level-one EPDCCH is merely an example for description, and this is not particularly limited in the present invention.

In addition, a specific value of K may be randomly determined according to a requirement. By way of example, and not limitation, when one RB includes seven symbols, the tune-frequency resource of the level-one EPDCCH may be the first symbol or the first four symbols of an RB to which the time-frequency resource of the level-one EPDCCH belongs.

Optionally, that the network device allocates a level-one dedicated channel and a level-two dedicated channel to the target terminal device includes:

allocating the level-one dedicated channel to the target terminal device according to a delay requirement of a service to be accessed by the target terminal device.

Specifically, for example, when the service to be accessed by the terminal device has a relatively high delay requirement, without detecting all symbols in an RB, the terminal device can obtain indication information of a time-frequency resource of a level-two dedicated EPDCCH by using the time-frequency resource of the level-one dedicated EPDCCH. Therefore, scheduling for the terminal device can be accelerated, and a service access delay of the terminal device can be reduced.

Optionally, the time-frequency resource of the level-one dedicated channel belongs to M resource blocks RBs in a same TTI, where M≥1.

Specifically, the time-frequency resource of the level-one EPDCCH may be M RBs in RBs to which the time-frequency resource of the level-one EPDCCH belongs in one TTI, and the remaining RB in the TTI may be used as, for example, a time-frequency resource of a PDSCH.

In addition, a specific value of M may be randomly determined according to a requirement, and is not particularly limited in the present invention.

Optionally, the level-one dedicated channel includes at least one channel element CE in a first TTI.

Specifically, in this embodiment of the present invention, the level-one dedicated channel (which is specifically the time-frequency resource of the level-one dedicated channel) may be divided on a basis of a channel element (CE, Channel Element). That is, the level-one dedicated channel may include at least one CE in one TTI (that is, an example of the first TTI).

Optionally, the time-frequency resource of the level-one dedicated channel is configured in a centralized or distributed manner in the first TTI.

Distributed configuration means that when an RB that is in the first TTI and that is allocated to the level-one dedicated channel is used to carry only the level-one dedicated channel, a time-frequency resource of each CF belongs to at least two RBs in the first TTI; or when an RB that is in the first TTI and that is allocated to the level-one dedicated channel is used to carry the level-one dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, a time-frequency resource of each CE belongs to a same RB in the first TTI; or when an RB that is in the first TTI and that is allocated to the level-one dedicated channel is used to carry the level-one dedicated channel and another channel, resource elements REs included in each CE are continuous in the frequency domain.

Specifically, in this embodiment of the present invention, the level-one dedicated channel may be configured in the centralized manner in a same or the level-one dedicated channel may be configured in the distributed manner in a same TTI.

First, a distributed configuration case is described in detail.

In this embodiment of the present invention, the level-one dedicated channel and another channel may multiplex RBs in a same by means of frequency division multiplexing. That is an RB that is in a TTI and that is allocated to the level-one dedicated channel is used to carry only the level-one dedicated channel, and cannot be used to carry another channel (for example, a PDSCH).

In this case, for example, the network device may divide the time-frequency resource A into the sub-time-frequency resource #$A_1$ to the sub-time-frequency resource #$A_x$. Each sub-time-frequency resource is used to carry a level-one dedicated channel of one terminal device. If each sub-time-frequency resource includes one or more CEs in a same TTI, and each CE may belong to at least two RBs, it may be considered that the level-one dedicated channel is configured in the distributed manner in the TTI.

Figure 7:
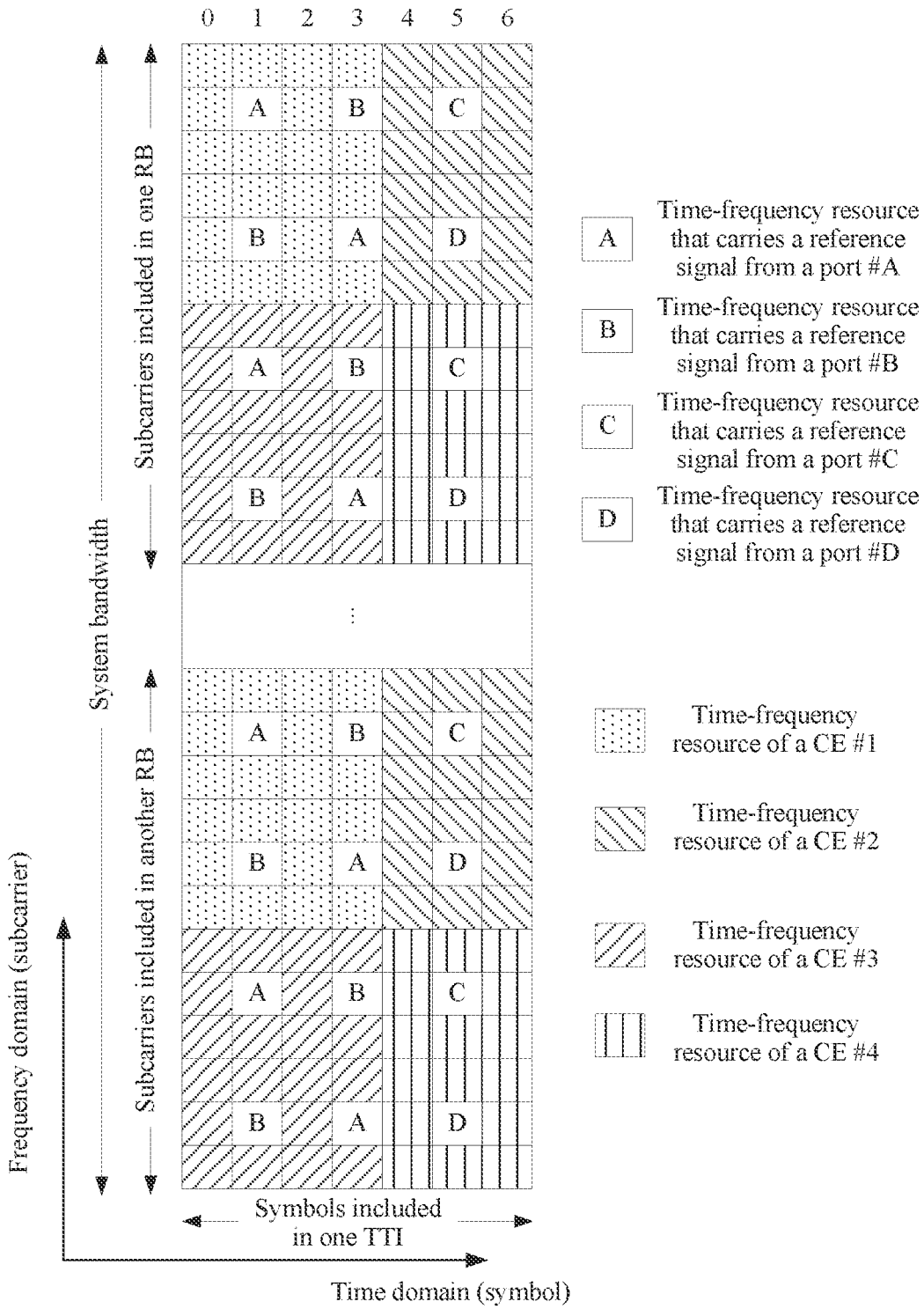
FIG. 7 is a schematic diagram of an example of a configuration manner of a time-frequency resource of a level-one dedicated channel or a level-two dedicated channel according to an embodiment of the present invention.

As shown in FIG. 7, a CE (for example, a CE #1, which may be used to carry the level-one dedicated channel) allocated by the network device to a terminal device may belong to at least two RBs. Further, the CE may include some time-frequency resources of the at least two RBs, for example, include some symbols of each RB. In addition, the remaining symbol of the same RB may be allocated to a CE of another terminal device, and the CE is used as a level-one dedicated channel allocated to the another terminal device.

Alternatively, a CE (for example, a CE #1, which may be used to carry the level-one dedicated channel) allocated by the network device to a terminal device may belong to at least two RBs, and the CE may include some time-frequency resources of the at least two RBs, for example, include some subcarriers of each RB.

It should be noted that the CE #1 to a CE #4 shown in FIG. 7 may be separately allocated to a plurality of terminal devices, and are separately used as level-one dedicated channels of the plurality of terminal devices.

Alternatively, some or all CEs in the CE #1 to a CE #4 shown in FIG. 7 may be allocated to a same terminal device, and are separately used as level-one dedicated channels of the terminal device.

When the level-one dedicated channel and another channel multiplex a same TTI by means of frequency division multiplexing, the level-one dedicated channel includes one or more CEs, and a time-frequency resource of each CE belongs to at least two RBs, so that the level-one dedicated channel can be configured in the distributed (or decentralized) manner in the system bandwidth. Therefore, a diversity gain can be effectively improved, and reliability and practicability of the present invention can be further improved.

In this embodiment of the present invention, the level-one dedicated channel and another channel may multiplex RBs in a same TTI by means of time division multiplexing. For example, as shown in FIG. 5, some symbols in an RB that is in a TTI and that is allocated to the level-one dedicated channel are used to carry the level-one dedicated channel, and another symbol in the same RB may be used to carry another channel (for example, a PDSCH).

In this case, if the level-one dedicated channel includes one or more CEs in a same TTI, and resource elements (RE, Resource Element) included in each CE are discontinuous, it may be considered that the level-one dedicated channel is configured in the distributed manner in the TTI.

Figure 8:
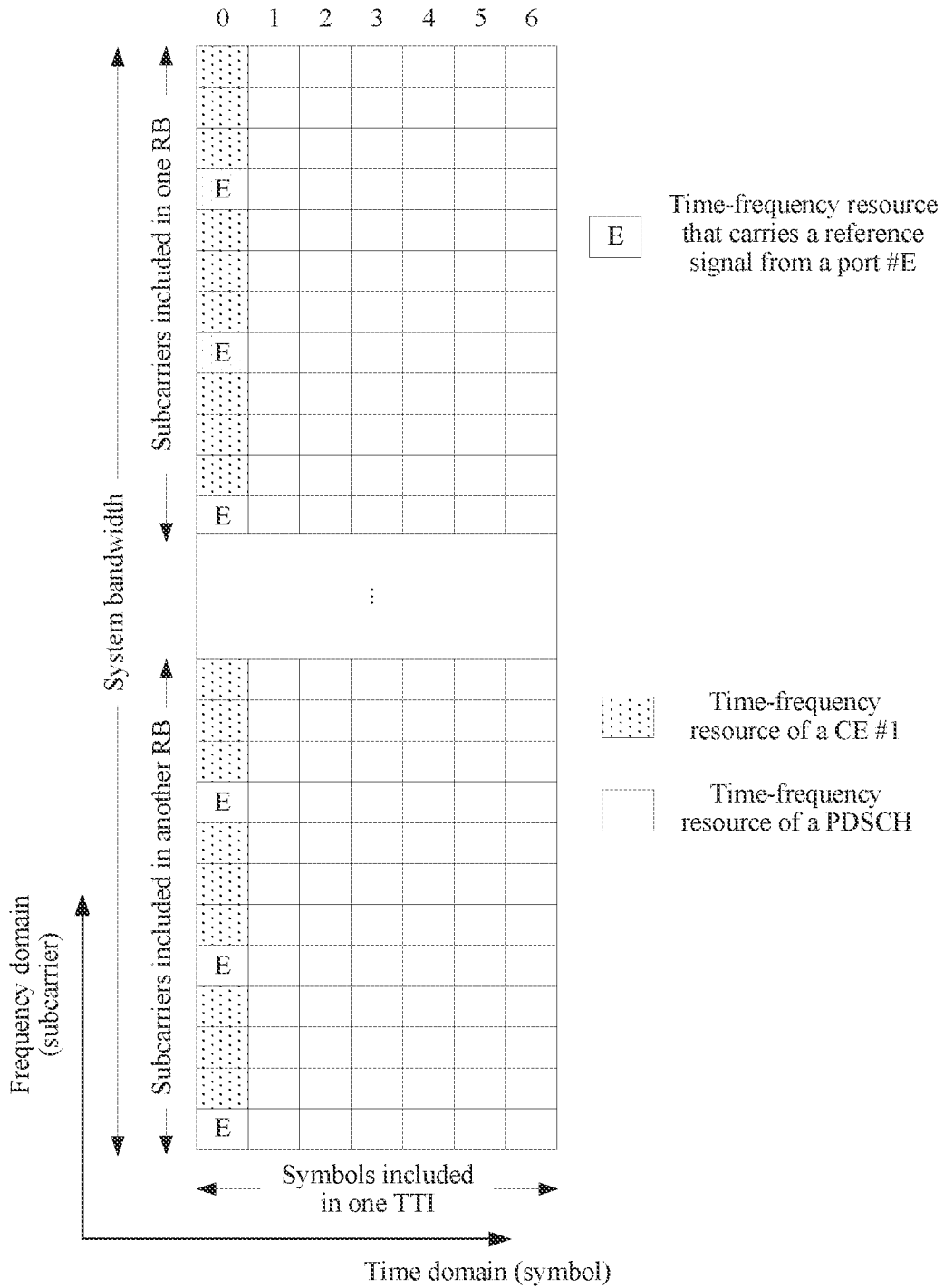
FIG. 8 is a schematic diagram of another example of a configuration manner of a time-frequency resource of a level-one dedicated channel or a level-two dedicated channel according to an embodiment of the present invention.

As shown in FIG. 8, a CE (for example, a CE #1) allocated by the network device to a terminal device may belong to parts (for example, two RBs) in a same TTI. Further, the CE may include some symbols (for example, the first symbols) of the two RBs, and the remaining symbols of the same RBs may be allocated to other channels (for example, a PDSCH).

When the level-one dedicated channel and another channel multiplex a same ITT by means of time division multiplexing, the level-one dedicated channel includes one or more CEs, and REs included in each CE are discontinuous, so that the level-one dedicated channel can be configured in the distributed (or decentralized) manner in the system bandwidth. Therefore, a diversity gain can be effectively improved, and reliability and practicability of the present invention can be further improved.

A centralized configuration case is described in detail below.

In this embodiment of the present invention, the level-one dedicated channel and another channel may multiplex RBs in a same TTI by means of frequency division multiplexing. That is, an RB that is in a TTI and that is allocated to the level-one dedicated channel is used to carry only the level-one dedicated channel, and cannot be used to carry another channel (for example, a PDSCH).

In this case, for example, the network device may divide the time-frequency resource A into the sub-time-frequency resource #$A_1$ to the sub-time-frequency resource #$A_x$. Each sub-time-frequency resource is used to carry a level-one dedicated channel of one terminal device. If each sub-time-frequency resource includes one or more CEs in a same TTI, and a time-frequency resource of each CE may belong to a same RB, it may be considered that the level-one dedicated channel is configured in the centralized manner in the TTI.

Figure 9:
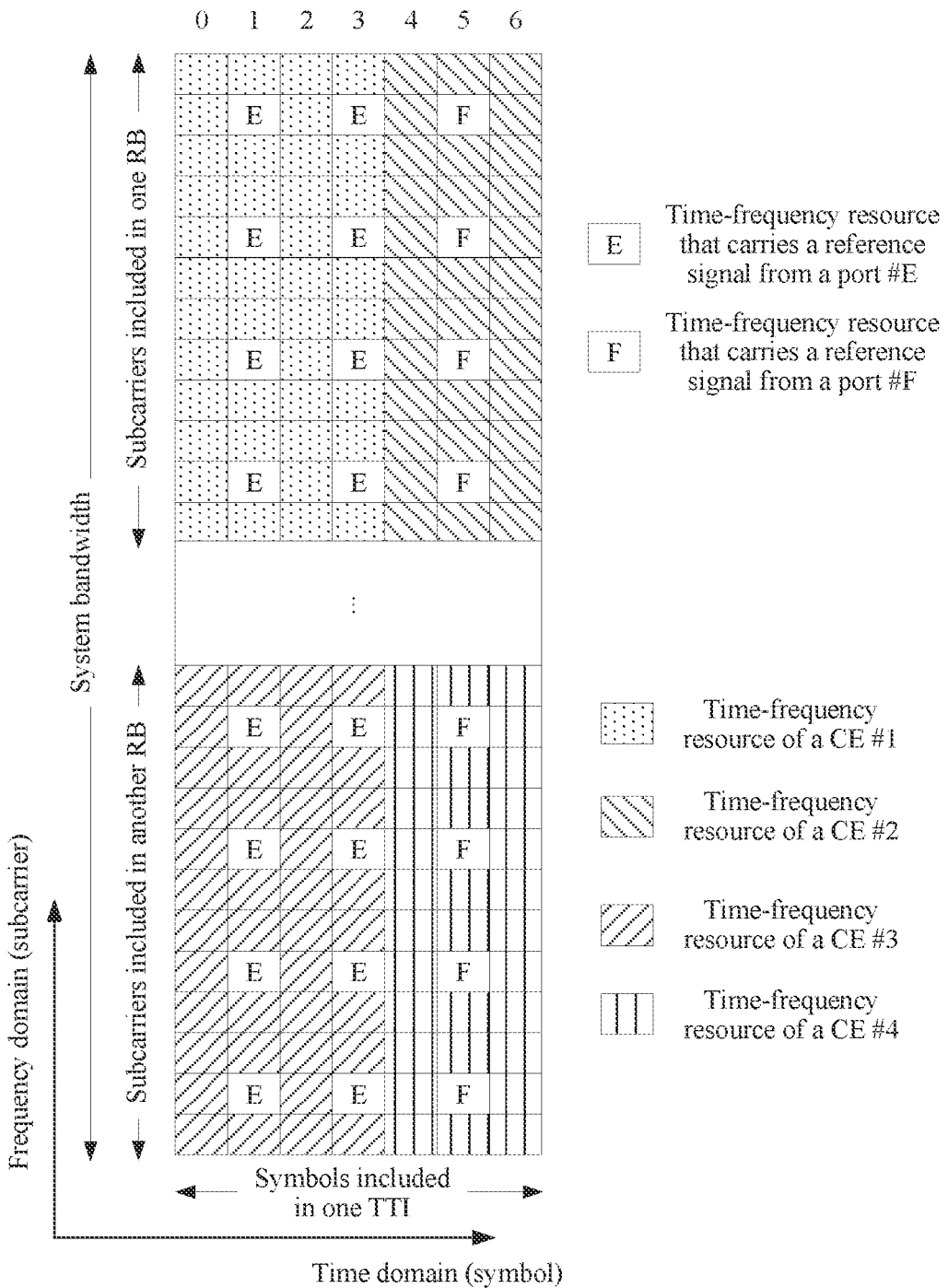
FIG. 9 is a schematic diagram of still another example of a configuration manner of a time-frequency resource of a level-one dedicated channel or a level-two dedicated channel according to an embodiment of the present invention.

As shown in FIG. 9, a CE (used to carry a level-one dedicated channel of a terminal device) allocated by the network device to the terminal device may belong to a same RB. In addition, the CE allocated to the terminal device may occupy only some symbols or some subcarriers in an RB. Another symbol or subcarrier may be allocated to another terminal device, and is used as a time-frequency resource of a level-one dedicated channel of the another terminal device.

It should be noted that a CE #1 to a CE #4 shown in FIG. 9 may be separately allocated to a plurality of terminal devices, and are separately used as level-one dedicated channels of the plurality of terminal devices.

When the level-one dedicated channel and another channel multiplex a same TTI by means of frequency division multiplexing, the level-one dedicated channel includes one or more CEs, and a time-frequency resource of each CE belongs to a same RB, so that the level-one dedicated channel can be configured in the centralized (or localized) manner in the system bandwidth. Therefore, the level-one dedicated channel can be configured in the centralized manner by selecting a channel with relatively good channel quality according to a channel interference status, and reliability and practicability of the present invention can be further improved.

In this embodiment of the present invention, the level-one dedicated channel and another channel may multiplex RBs in a same TTI by means of time division multiplexing. For example, as shown in FIG. 5, some symbols in an RB that is in a TTI and that is allocated to the level-one dedicated channel are used to carry the level-one dedicated channel, and another symbol in the same RB may be used to carry another channel (for example, a PDSCH).

In this case, if the level-one dedicated channel includes one or more CEs in a same TTI, and resource elements (RE, Resource Element) included in each CE are continuous, it may be considered that the level-one dedicated channel is configured in the centralized manner in the TTI.

Figure 10:
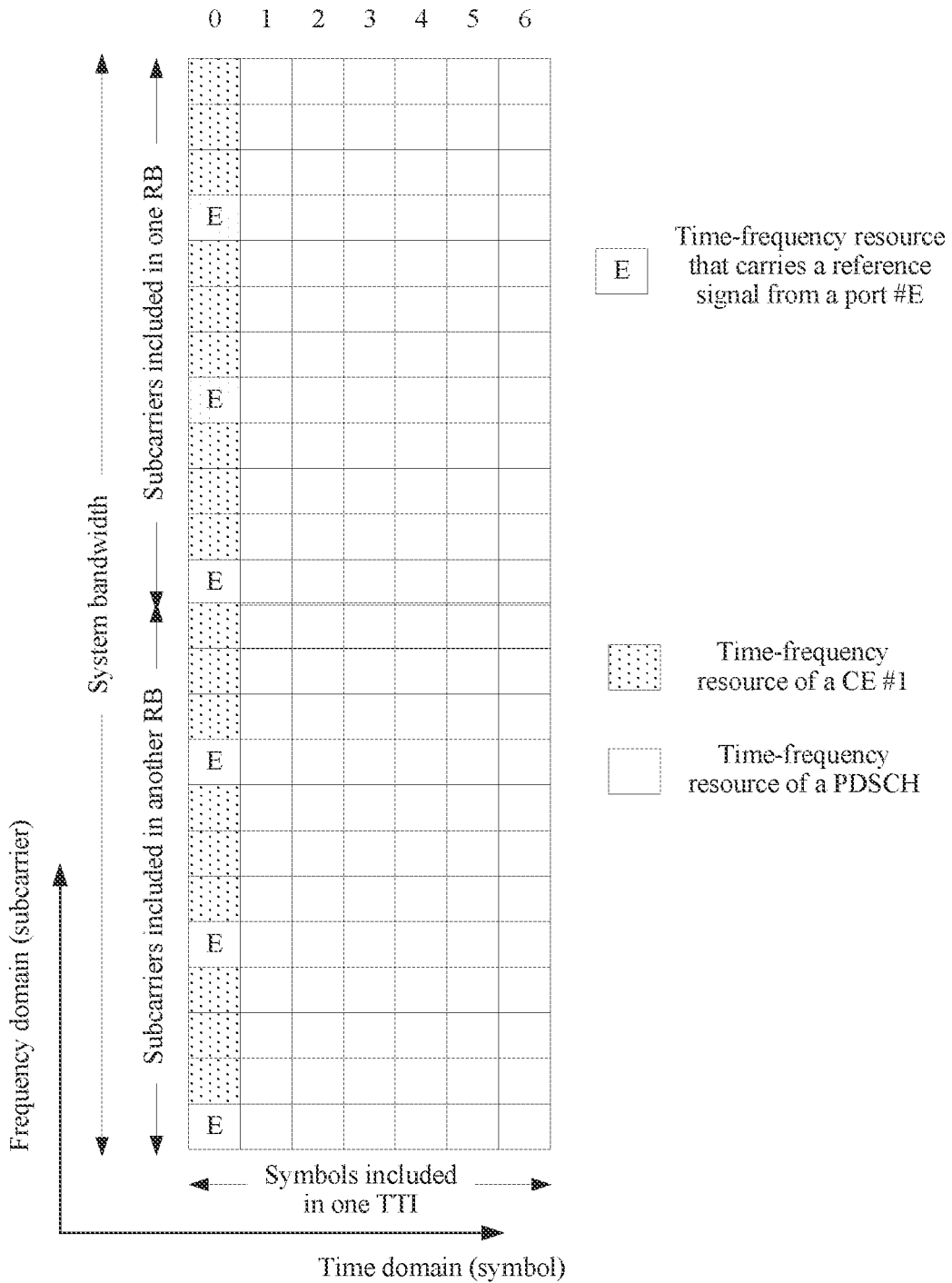
FIG. 10 is a schematic diagram of still another example of a configuration manner of a time-frequency resource of a level-one dedicated channel or a level-two dedicated channel according to an embodiment of the present invention.

As shown in FIG. 10, a CE (for example, a CE #1) allocated by the network device to a terminal device may belong to all RBs in a same TTI. Further, the CE may include some symbols (for example, the first symbols) in all the RBs in the same TTI, and the remaining symbols of the same RBs may be allocated to other channels (for example, a PDSCH).

When the level-one dedicated channel and another channel multiplex a same TTI by means of time division multiplexing, the level-one dedicated channel includes one or more CEs, and REs included in each CE are continuous, so that the level-one dedicated channel can be configured in the centralized (or localized) manner in the system bandwidth. Therefore, the level-one dedicated channel can be configured in the centralized manner by selecting a channel with relatively good channel quality according to a channel interference status, and reliability and practicability of the present invention can be further improved.

It should be understood that the foregoing enumerated time-frequency resource distribution manners are merely examples for description, and the present invention is not limited thereto. This may be adjusted according to a requirement.

In addition, as shown in FIG. 3 to FIG. 10, the level-one dedicated channel may further include a time-frequency resource used to carry a reference channel (or a pilot signal).

Furthermore, in this embodiment of the present invention, each port may independently occupy a time-frequency resource, for example, ports shown in FIG. 3 to FIG. 7. For example, any one of a port #1 to a port #4 or a port #A to a port #D may be one port.

Alternatively, in this embodiment of the present invention, a plurality of ports may multiplex a same time-frequency resource. For example, in ports shown in FIG. 8 to FIG. 10, a port #E may include a plurality of (for example, four) ports, or a port #F in FIG. 9 may include a plurality of (for example, four) ports, and the ports included in the port #E are different from the ports included in the port #F.

A configuration manner of a time-frequency resource of the level-two EPDCCH (that is, an example of the level-two dedicated channel) is described in detail below.

Optionally, the time-frequency resource of the level-two dedicated channel belongs to at least two resource blocks RBs.

Specifically, the time-frequency resource of the level-two EPDCCH may be allocated on a basis of an RB, that is, the time-frequency resource of the level-two FPDCCH may belong to at least two RBs. It should be noted that "belonging to at least two RBs" means that the time-frequency resource of the level-two EPDCCH may include all time-frequency resources of the at least two RBs, or may include some time-frequency resources of the at least two RBs, for example, include a half quantity of subcarriers or symbols of each RB.

Optionally, the at least two RBs to which the time-frequency resource of the level-two dedicated channel belongs are discontinuous.

Specifically, the time-frequency resource of the level-two FPDCCH may be carried in at least two RBs that are not adjacent to each other. Therefore, a transmission diversity gain can be improved.

Optionally, in the frequency domain, the time-frequency resource of the level-two dedicated channel is located at two ends of the preset bandwidth.

Specifically, the time-frequency resource of the level-two EPDCCH may belong to at least two RBs at the two ends of the preset bandwidth.

In addition, in this embodiment of the present invention, the preset bandwidth is bandwidth that is preset by the network device and the terminal device in advance. By way of example, and not limitation, the preset bandwidth may be system bandwidth used by the communications system.

Optionally, the at least two RBs to which the time-frequency resource of the level-two dedicated channel belong are continuous. A time-frequency resource that is of the level-two dedicated channel and that belongs to a third RB and a time-frequency resource that is of the level-two dedicated channel and that belongs to a fourth RB are discontinuous.

Specifically, the time-frequency resource of the level-two EPDCCH may belong to at least two RBs, and only some (for example, a half quantity of) subcarriers in the at least two RBs are used as the time-frequency resource of the level-two EPDCCH. In addition, when two RBs to which the time-frequency resource of the level-two EPDCCH may belong are adjacent, subcarriers that are in the two RBs and that are used as the time-frequency resource of the level-two EPDCCH are discontinuous.

Optionally, the time-frequency resource of the level-two dedicated channel includes the first K symbols in a same transmission time interval TTI, where K≥1.

Specifically, the time-frequency resource of the level-two EPDCCH may be the first K symbols of an RB to which the time-frequency resource of the level-two EPDCCH belongs, and the remaining symbol of the RB may be used as, for example, a time-frequency resource of a PDSCH.

Figure 6:
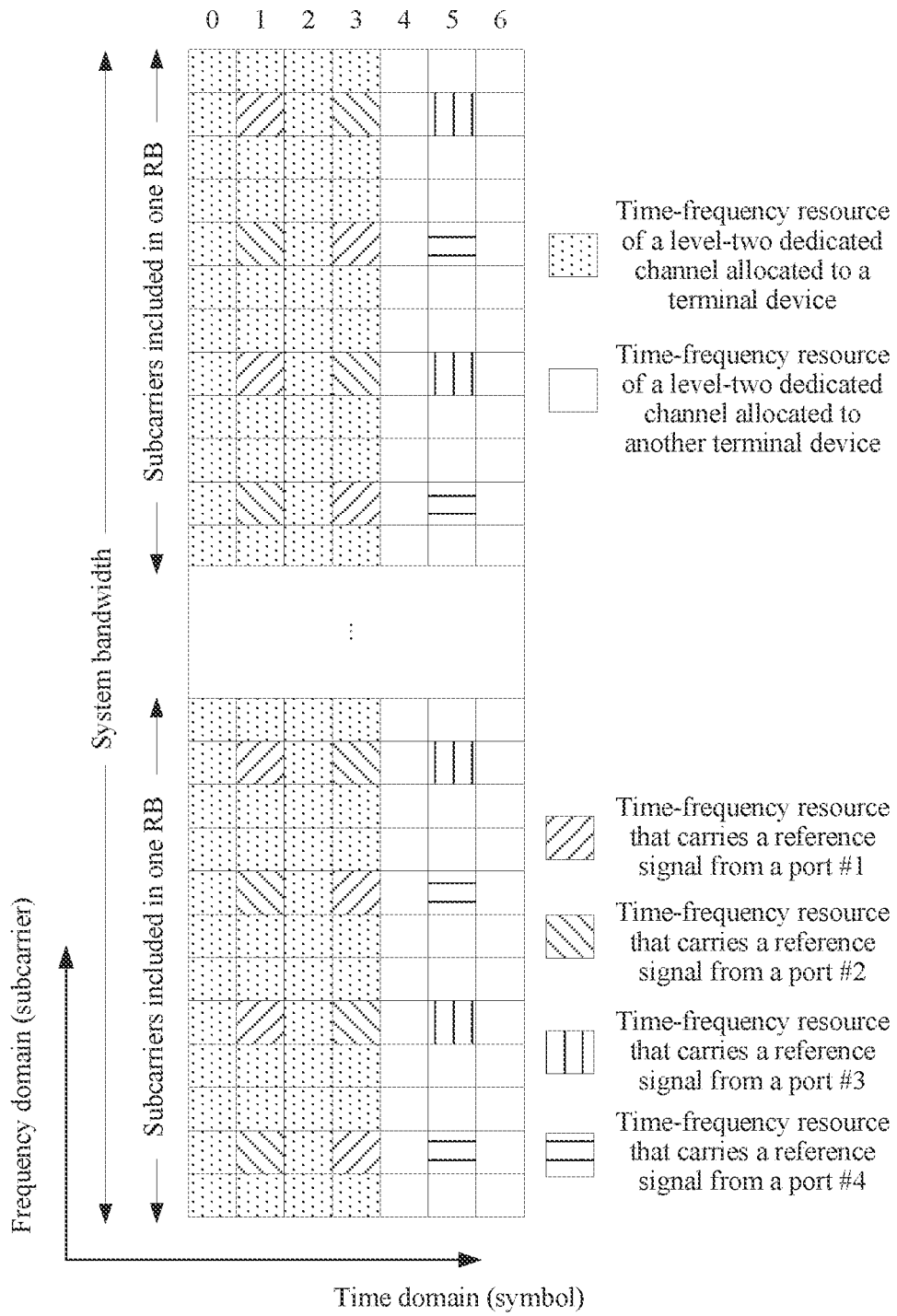
FIG. 6 is a schematic diagram of still another example of a distribution manner of a time-frequency resource of a level-one dedicated channel or a level-two dedicated channel according to an embodiment of the present invention.

It should be understood that the foregoing enumerated function of a symbol other than a symbol that is in an RB and that is used as the time-frequency resource of the level-two EPDCCH is merely an example for description, and this is not particularly limited in the present invention. For example, FIG. 6 is a schematic diagram of another example of a distribution manner of the time-frequency resource of the level-two EPDCCH. As shown in FIG. 6, a time-frequency resource of a level-two EPDCCH allocated to a terminal device may be the first K symbols of an RB to which the time-frequency resource of the level-two EPDCCH belongs, and the remaining symbol of the RB may be used as, for example, a time-frequency resource of a level-two EPDCCH allocated to another terminal device.

In addition, a specific value of K may be randomly determined according to a requirement. By way of example, and not limitation, when one RB includes seven symbols, the time-frequency resource of the level-two EPDCCH may be the first symbol or the first four symbols of an RB to which the time-frequency resource of the level-two EPDCCH belongs.

Optionally, that the network device allocates a level-one dedicated channel and a level-two dedicated channel to the target terminal device includes:
    allocating the level-two dedicated channel to the target terminal device according to a delay requirement of a service to be accessed by the target terminal device.

Specifically, for example, when the service to be accessed by the terminal device has a relatively high delay requirement, without detecting all symbols in an RB, the terminal device can obtain scheduling information by using a time-frequency resource of a level-two dedicated. EPDCCH. Therefore, scheduling for the terminal device can be accelerated, and a service access delay of the terminal device can be reduced.

Optionally, the time-frequency resource of the level-two dedicated channel belongs to M resource blocks RBs in a same TTI, where M≥1.

Specifically, the time-frequency resource of the level-two EPDCCH may be M RBs in RBs to which the time-frequency resource of the level-two EPDCCH belongs in one TTI, and the remaining RB in the TTI may be used as, for example, a time-frequency resource of a PDSCH.

In addition, a specific value of M may be randomly determined according to a requirement, and is not particularly limited in the present invention.

Optionally, the level-two dedicated channel includes at least one channel element CE in a first TTI.

Specifically, in this embodiment of the present invention, the level-two dedicated channel (which is specifically the time-frequency resource of the level-two dedicated channel) may be divided on a basis of a channel element (CE, Channel Element). That is, the level-two dedicated channel may include at least one CE in one TTI (that is, an example of the first TTI).

Optionally, the time-frequency resource of the level-two dedicated channel is configured in a centralized or distributed manner in the first TTI.

Distributed configuration means that when an RB that is in the first TTI and that is allocated to the level-two dedicated channel is used to carry only the level-two dedicated channel, a time-frequency resource of each CE belongs to at least two RBs in the first TTI; or when an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-two dedicated channel is used to carry only the level-two dedicated channel, a time-frequency resource of each CE belongs to a same RB in the first TTI; or when an RB that is in the first TTI and that is allocated to the level-two dedicated channel is used to carry the level-two dedicated channel and another channel, resource elements REs included in each CE are continuous in the frequency domain.

Specifically, in this embodiment of the present invention, the level-two dedicated channel may be configured in the centralized manner in a same TTI, or the level-two dedicated channel may be configured in the distributed manner in a same TTI.

First, a distributed configuration case is described in detail.

In this embodiment of the present invention, the level-two dedicated channel and another channel may multiplex RBs in a same TTI by means of frequency division multiplexing. That is, an RB that is in a TTI and that is allocated to the level-two dedicated channel is used to carry only the level-two dedicated channel, and cannot be used to carry another channel (for example, a PDSCH).

In this case, if the level-two dedicated channel includes one or more CEs in a same TTI, and each CE may belong to at least two RBs, it may be considered that the level-two dedicated channel is configured in the distributed manner in the TTI.

As shown in FIG. 7, a CE (for example, a CE #1, which may be used to carry the level-two dedicated channel) allocated by the network device to a terminal device may belong to at least two RBs. Further, the CE may include some time-frequency resources of the at least two RBs, for example, include some symbols of each RB. In addition, the remaining symbol of the same RB may be allocated to a CE of another terminal device.

Alternatively, a CE allocated by the network device to a terminal device may belong to at least two RBs, and the CE may include some time-frequency resources of the at least two RBs, for example, include some subcarriers of each RB.

It should be noted that the CE #1 to a CE #4 shown in FIG. 7 may be separately allocated to a plurality of terminal devices, and are separately used as level-two dedicated channels of the plurality of terminal devices.

Alternatively, some or all CEs in the CE #1 to a CE #4 shown in FIG. 7 may be allocated to a same terminal device, and are separately used as level-two dedicated channels of the terminal device.

When the level-two dedicated channel and another channel multiplex a same TTI by means of frequency division multiplexing, the level-two dedicated channel includes one or more CEs, and a time-frequency resource of each CE belongs to at least two RBs, so that the level-two dedicated channel can be configured in the distributed (or decentralized) manner in the system bandwidth. Therefore, a diversity gain can be effectively improved, and reliability and practicability of the present invention can be further improved.

In this embodiment of the present invention, the level-two dedicated channel and another channel may multiplex RBs in a same TTI by means of time division multiplexing. For example, as shown in FIG. 5, some symbols in an RB that is in a TTI and that is allocated to the level-one dedicated channel are used to carry the level-two dedicated channel, and another symbol in the same RB may be used to carry another channel (for example, a PDSCH).

In this case, if the level-two dedicated channel includes one or more CEs in a same TTI, and resource elements (RE, Resource Element) included in each CE are discontinuous, it may be considered that the level-two dedicated channel is configured in the distributed manner in the TTI.

As shown in FIG. 8, a CE (for example, a CE #1) allocated by the network device to a terminal device may belong to parts (fix example, two RBs) in a same TTI. Further, the CE may include some symbols (for example, the first symbols) of the two RBs, and the remaining symbols of the same RBs may be allocated to other channels (for example, a PDSCH).

When the level-two dedicated channel and another channel multiplex a same TTI by means of time division multiplexing, the level-two dedicated channel includes one or more CEs, and REs included in each CE are discontinuous, so that the level-two dedicated channel can be configured in the distributed (or decentralized) manner in the system bandwidth. Therefore, a diversity gain can be effectively improved, and reliability and practicability of the present invention can be further improved.

A centralized configuration case is described in detail below.

In this embodiment of the present invention, the level-two dedicated channel and another channel may multiplex RBs in a same TTI by means of frequency division multiplexing. That is, an RB that is in a TTI and that is allocated to the level-one dedicated channel is used to carry only the level-two dedicated channel, and cannot be used to carry another channel (for example, a PDSCH).

In this case, if a level-two dedicated channel includes one or more CEs in a same TTI, and a time-frequency resource of each CE may belong to a same RB, it may be considered that the level-two dedicated channel is configured in the centralized manner in the TTI.

As shown in FIG. 9, a CE (used to carry a level-two dedicated channel of a terminal device) allocated by the network device to the terminal device may belong to a same RB. In addition, the CE allocated to the terminal device may occupy only some symbols or some subcarriers in an RB. Another symbol or subcarrier may be allocated to another terminal device, and is used as a time-frequency resource of a level-two dedicated channel of the another terminal device.

It should be noted that a CE #1 to a CE #4 shown in FIG. 9 may be separately allocated to a plurality of terminal devices, and are separately used as level-two dedicated channels of the plurality of terminal devices.

When the level-two dedicated channel and another channel multiplex a same TTI by means of frequency division multiplexing, the level-two dedicated channel includes one or more CEs, and a time-frequency resource of each CE belongs to a same RB, so that the level-two dedicated channel can be configured in the centralized (or localized) manner in the system bandwidth. Therefore, the level-two dedicated channel can be configured in the centralized manner by selecting a channel with relatively good channel quality according to a channel interference status, and reliability and practicability of the present invention can be further improved.

In this embodiment of the present invention, the level-two dedicated channel and another channel may multiplex RBs in a same TTI by means of time division multiplexing. For example, as shown in FIG. 5, some symbols in an RB that is in a TTI and that is allocated to the level-one dedicated channel are used to carry the level-two dedicated channel, and another symbol in the same RB may be used to carry another channel (for example, a PDSCH).

In this case, if the level-two dedicated channel includes one or more CEs in a same TTI, and resource elements (RE, Resource Element) included in each CE are continuous, it may be considered that the level-two dedicated channel is configured in the centralized manner in the TTI.

As shown in FIG. 10, a CE (for example, a CE #1) allocated by the network device to a terminal device may belong to all RBs in a same TTI. Further, the CE may include some symbols (for example, the first symbols) in all the RBs in the same TTI, and the remaining symbols of the same RBs may be allocated to other channels (for example, a PDSCH).

When the level-two dedicated channel and another channel multiplex a same TTI by means of time division multiplexing, the level-two dedicated channel includes one or more CEs, and REs included in each CE are continuous, so that the level-two dedicated channel can be configured in the centralized (or localized) manner in the system bandwidth. Therefore, the level-two dedicated channel can be configured in the centralized manner by selecting a channel with relatively good channel quality according to a channel interference status, and reliability and practicability of the present invention can be further improved.

It should be understood that the foregoing enumerated time-frequency resource distribution manners are merely examples for description, and the present invention is not limited thereto. This may be adjusted according to a requirement.

In addition, as shown in FIG. 3 to FIG. 10, the level-two dedicated channel may further include a time-frequency resource used to carry a reference channel (or a pilot signal).

Furthermore, in this embodiment of the present invention, each port may independently occupy a time-frequency resource, for example, ports shown in FIG. 3 to FIG. 7. For example, any one of a port #1 to a port #4 or a port #A to a port #D may be one port.

Alternatively, in this embodiment of the present invention, a plurality of ports may multiplex a same time-frequency resource. For example, in ports shown in FIG. 8 to FIG. 10, a port #E may include a plurality of (for example, four) ports, or a port #F in FIG. 10 may include a plurality of (for example, four) ports, and the ports included in the port #E are different from the ports included in the port #F.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Specifically, in this embodiment of the present invention, a configuration pattern of the time-frequency resource that is of the level-one dedicated channel (for example, the level-one EPDCCH) and that is used to carry the reference signal (or the pilot signal) may be the same as a configuration pattern of the time-frequency resource that is of the level-two dedicated channel (for example, the level-two EPDCCH) and that is used to carry the reference signal (or the pilot signal).

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first TTI, of a time-frequency resource that is in each CE of the level-two dedicated channel and that is used to transmit a reference signal.

It should be noted that in this embodiment of the present invention, the CE may be a control channel element CCE (Control Channel Element), may be an enhanced control channel element (ECCE, Enhanced Control Channel Element), or may be a control channel element of another type, and this is not particularly limited in the present invention.

Figure 11:
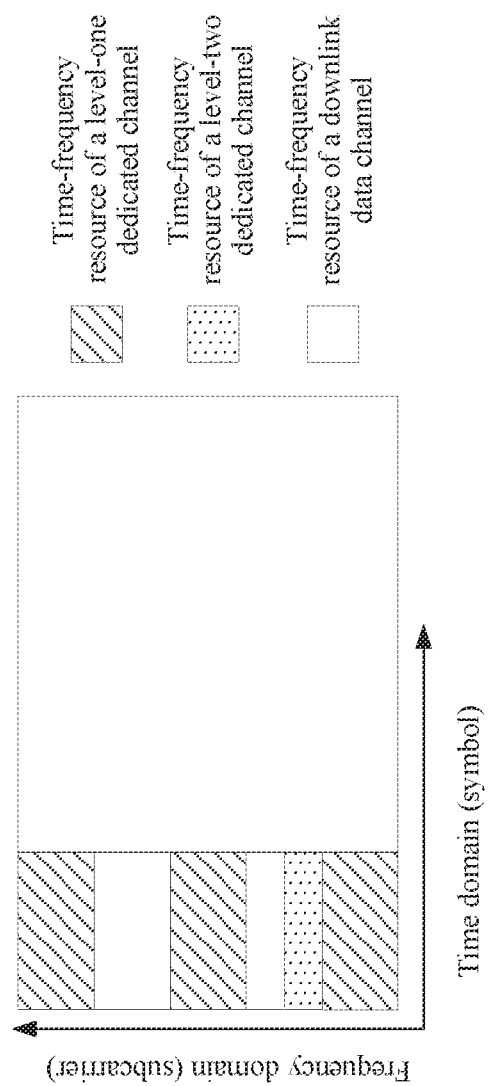
FIG. 11 is a schematic diagram of still another example of a distribution manner of a level-one dedicated channel and a level-two dedicated channel according to an embodiment of the present invention.

FIG. 11 is a schematic diagram of an example of a configuration manner of the level-one dedicated channel, the level-two dedicated channel, and a downlink data channel. As shown in FIG. 11, in this embodiment of the present invention, dedicated channels (including the level-one dedicated channel and the level-two dedicated channel) and some downlink data channels may be configured by means of time division multiplexing. In addition, dedicated channels and the other downlink data channels may be configured by means of frequency division multiplexing, and the level-one dedicated channel and the level-two dedicated channel may be configured by means of frequency division multiplexing.

It should be understood that the foregoing enumerated configuration manner of the level-one dedicated channel, the level-two dedicated channel, and the downlink data channel is merely an example for description, and the present invention is not limited thereto.

Optionally, the communications system further includes a common channel. The common channel has a time-frequency resource different from a time-frequency resource of the dedicated channel. The common channel is detected by all terminal devices in the communications system. The method further includes:

sending, by the network device, indication information of the common channel by using a preset second time-frequency resource; and sending, by the network device, a common message by using the common channel; or sending, by the network device, indication information of a fourth time-frequency resource by using the common channel, and sending a common message by using the fourth time-frequency resource, where the fourth time-frequency resource belongs to a time-frequency resource of the downlink data channel PDSCH.

The common message includes at least one of a random access response message, a paging message, or a system message.

The "common channel" herein may be detected by all the terminal devices in the system.

In addition, the "common message" may be a message sent by the network device to all the terminal devices in the system, for example, in a broadcast manner. By way of example, and not limitation, the "common message" may include an existing message that needs to be transmitted to all the terminal devices in a common search area of a PDCCH, for example, a system message, a random access response message, or a paging message.

Optionally, the common channel is a common enhanced downlink control channel EPDCCH.

Specifically, in this embodiment of the present invention, EPDCCHs in the communications system may be classified into a dedicated EPDCCH and a common EPDCCH. The "common EPDCCH" is an EPDCCH detected by all the terminal devices in the system.

It should be understood that the foregoing enumerated solution in which the EPDCCH is used as the common channel is merely an example for description, and the present invention is not limited thereto. For example, a future enhanced downlink control channel (FEPDCCH) or a common PDCCH may be used as the common channel.

The network device may deliver indication information of a time-frequency resource of the common channel to a terminal device according to a preset time-frequency resource (that is, an example of the second time-frequency resource) that is used to transmit system information (for example, a MIB). Therefore, the terminal device in the system can obtain the indication information of the time-frequency resource of the common channel by using the preset time-frequency resource, and further determine the time-frequency resource of the common channel.

For example, the network device may send the common message by using the common channel. Therefore, the terminal device may perform receiving processing (or search processing) on the time-frequency resource of the common channel to obtain the common message.

Alternatively, the network device may send indication information of a time-frequency resource of a PDSCH by using the common channel, and send the common message on the time-frequency resource of the PDSCH. Therefore, the terminal device can obtain the indication information of the time-frequency resource of the PDSCH by using the common channel, further determine the time-frequency resource that is of the PDSCH and that is used to carry the common message, and perform receiving processing on the time-frequency resource to obtain the common message.

It should be noted that in this embodiment of the present invention, the indication information of the time-frequency resource of the common channel (for example, the common EPDCCH) and indication information of the time-frequency resource of the level-one dedicated channel (for example, the level-one EPDCCH) may be sent by using a same message or by using different messages, and this is not particularly limited in the present invention.

In addition, in this embodiment of the present invention, a distribution manner of a time-frequency resource of the common EPDCCH may be similar to the distribution manner (for example, manners shown in FIG. 3 to FIG. 8) of the time-frequency resource of the level-one EPDCCH. To avoid repetition, detailed descriptions thereof are omitted herein.

Optionally, the time-frequency resource of the common channel includes the first K symbols in a same transmission time interval TTI, where K≥1.

Optionally, the time-frequency resource of the common channel belongs to M resource blocks RBs in a same TTI, where M≥1.

Optionally, the time-frequency resource of the common channel belongs to at least two resource blocks RBs.

Optionally, the at least two RBs to which the time-frequency resource of the common channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

Optionally, in the frequency domain, the time-frequency resource of the common channel is located at two ends of the preset system bandwidth.

In addition, in this embodiment of the present invention, the preset bandwidth is bandwidth that is preset by the network device and the terminal device in advance. By way of example, and not limitation, the preset bandwidth may be system bandwidth used by the communications system.

According to the scheduling information transmission method in this embodiment of the present invention, the at least two levels of dedicated channels are configured, and when resource scheduling needs to be performed for the terminal device, the indication information of the time-frequency resource of the level-one dedicated channel is sent by using the first time-frequency resource used to transmit system information, so that the indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

In addition, because both the level-one dedicated channel and the level-two dedicated channel are allocated to one terminal device, the scheduling information transmission method in the present invention can be applied to a multiple-input multiple-output (MIMO, Multiple-Input Multiple-Output) transmission scenario.

Furthermore, the common channel is configured, so that scheduling information transmission no longer depends on an existing PDCCH, and prior-art configuration of the PDCCH can be abandoned. Therefore, resource configuration flexibility can be further improved.

The scheduling information transmission method according to the embodiments of the present invention is described in detail above with reference to FIG. 1 to FIG. 11 from the perspective of the network device. A scheduling information transmission method according to an embodiment of the present invention is described below with reference to FIG. 12 from a perspective of a terminal device.

FIG. 12 is a schematic flowchart of an information transmission method 200 according to an embodiment of the present invention that is described from a perspective of a terminal device. The method 200 is performed in a communications system that includes at least two levels of dedicated channels used for downlink control. The dedicated channels at the levels are corresponding to different time-frequency resources. The dedicated channel is detected only by a terminal device to which the dedicated channel is allocated. As shown in FIG. 12, the method 200 includes the following steps.

S210. A target terminal device receives, by using a preset first time-frequency resource, indication information that is of the level-one dedicated channel and that is sent by a network device.

S220. The target terminal device determines the level-one dedicated channel according to the indication information of the level-one dedicated channel.

S230. The target terminal device receives, by using the level-one dedicated channel, indication information that is of the level-two dedicated channel and that is sent by the network device.

Alternatively, the target terminal device receives, by using the level-one dedicated channel, indication information that is of a third time-frequency resource and that is sent by the network device, and receives, by using the third time-frequency resource, indication information that is of the level-two dedicated channel and that is sent by the network device, where the third time-frequency resource belongs to a time-frequency resource of a physical downlink data channel PDSCH.

S240. The target terminal device determines the level-two dedicated channel according to the indication information of the level-two dedicated channel.

S250. The target terminal device receives, by using the level-two dedicated channel, dedicated scheduling information that is sent by the network device and that is for the target terminal device.

Optionally, a time-frequency resource of the level-one dedicated channel or a time-frequency resource of the level-two dedicated channel includes the first K symbols in a same transmission time interval TTI, where $K \geq 1$.

Optionally, the time-frequency resource of the level-one dedicated channel or the time-frequency resource of the level-two dedicated channel belongs to M resource blocks RBs in a same TTI, where $M \geq 1$.

Optionally, the level-one dedicated channel or the level-two dedicated channel is allocated by the network device according to a delay requirement of a service to be accessed by the target terminal device.

Optionally, the time-frequency resource of the level-one dedicated channel belongs to at least two resource blocks RBs.

Optionally, the at least two RBs to which the time-frequency resource of the level-one dedicated channel belongs are discontinuous.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Optionally, in a frequency domain, the time-frequency resource of the level-one dedicated channel is located at two ends of a preset bandwidth.

Optionally, the level-one dedicated channel or the level-two dedicated channel includes at least one channel element CE in a first TTI.

Optionally, the time-frequency resource of the level-one dedicated channel or the time-frequency resource of the level-two dedicated channel is configured in a centralized or distributed manner in the first TTI.

Distributed configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to at least two RBs in the first TTI; or when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to a same RB in the first TTI; or when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are continuous in the frequency domain.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first TTI, of a time-frequency resource that is in each CE of the level-two dedicated channel and that is used to transmit a reference signal.

Optionally, the communications system further includes a common channel. The common channel has a time-frequency resource different from a time-frequency resource of the dedicated channel. The common channel is detected by all terminal devices in the communications system. The method further includes:
 receiving, by the target terminal device by using a preset second time-frequency resource, indication information that is of the common channel and that is sent by the network device; and
 receiving, by the target terminal device by using the common channel, a common message sent by the network device; or
 receiving, by the target terminal device by using the common channel, indication information that is of a fourth time-frequency resource and that is sent by the network device, and receiving, by using the fourth time-frequency resource, a common message sent by the network device, where the fourth time-frequency resource belongs to a time-frequency resource of the PDSCH.

The common message includes at least one of a random access response message, a paging message, or a system message.

Optionally, the common channel is a common enhanced downlink control channel EPDCCH.

Optionally, the dedicated channel is a dedicated EPDCCH.

Optionally, the time-frequency resource of the common channel includes the first K symbols in a same transmission time interval TTI, where K≥1.

Optionally, the time-frequency resource of the common channel belongs to M resource blocks RBs in a same TTI, where M≥1.

Optionally, the time-frequency resource of the common channel belongs to at least two resource blocks RBs.

Optionally, the at least two RBs to which the time-frequency resource of the common channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

Optionally, in the frequency domain, the time-frequency resource of the common channel is located at two ends of system bandwidth used by the communications system.

Actions of the terminal device in the method 200 are similar to actions of the terminal device in the method 100, and actions of the network device in the method 200 are similar to actions of the network device in the method 100. To avoid repetition, detailed descriptions thereof are omitted herein.

According to the scheduling information transmission method in this embodiment of the present invention, the at least two levels of dedicated channels are configured, and when resource scheduling needs to be performed for the terminal device, indication information of the time-frequency resource of the level-one dedicated channel is sent by using the first time-frequency resource used to transmit system information, so that indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

Furthermore, the common channel is configured, so that scheduling information transmission no longer depends on an existing PDCCH, and prior-art configuration of the PDCCH can be abandoned. Therefore, resource configuration flexibility can be further improved.

The scheduling information transmission methods according to the embodiments of the present invention are described in detail above with reference to FIG. 1 to FIG. 12. Scheduling information transmission apparatuses according to embodiments of the present invention are described in detail below with reference to FIG. 13 and FIG. 14.

Figure 13:
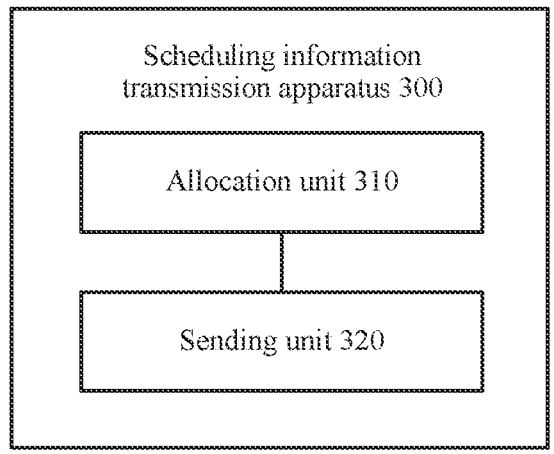
FIG. 13 is a schematic block diagram of a scheduling information transmission apparatus according to an embodiment of the present invention.

FIG. 13 is a schematic block diagram of an information transmission apparatus 300 according to an embodiment of the present invention. The apparatus 300 is configured in a communications system that includes at least two levels of dedicated channels used for downlink control. The dedicated channels at the levels are corresponding to different time-frequency resources. The dedicated channel is detected only by a terminal device to which the dedicated channel is allocated. As shown in FIG. 13, the apparatus 300 includes:
 an allocation unit 310, configured to allocate a level-one dedicated channel and a level-two dedicated channel to a target terminal device; and
 a sending unit 320, configured to: send indication information of the level-one dedicated channel by using a preset first time-frequency resource;
 send indication information of the level-two dedicated channel to the target terminal device by using the level-one dedicated channel; or
 send indication information of a third time-frequency resource to the target terminal device by using the level-one dedicated channel, and send indication information of the level-two dedicated channel to the target terminal device by using the third time-frequency resource, where the third time-frequency resource belongs to a time-frequency resource of a physical downlink data channel PDSCH; and send dedicated scheduling information for the target terminal device to the target terminal device by using the level-two dedicated channel.

Optionally, a time-frequency resource of the level-one dedicated channel or a time-frequency resource of the level-two dedicated channel includes the first K symbols in a same transmission time interval TTI, where K≥1.

Optionally, the time-frequency resource of the level-one dedicated channel or the time-frequency resource of the level-two dedicated channel belongs to M resource blocks RBs in a same TTI, where M≥1.

Optionally, the allocation unit is specifically configured to allocate the level-one dedicated channel or the level-two dedicated channel to the target terminal device according to a delay requirement of a service to be accessed by the target terminal device.

Optionally, the time-frequency resource of the level-one dedicated channel belongs to at least two resource blocks RBs.

Optionally, the at least two RBs to which the time-frequency resource of the level-one dedicated channel belongs are discontinuous.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Optionally, in a frequency domain, the time-frequency resource of the level-one dedicated channel is located at two ends of preset bandwidth.

Optionally, the level-one dedicated channel or the level-two dedicated channel includes at least one channel element CE in a first TTI.

Optionally, the time-frequency resource of the level-one dedicated channel or the time-frequency resource of the level-two dedicated channel is configured in a centralized or distributed manner in the first TTI.

Distributed configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to at least two RBs in the first TTI; or
when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to a same RB in the first TTI; or
when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are continuous in the frequency domain.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first TTI, of a time-frequency resource that is in each CE of the level-two dedicated channel and that is used to transmit a reference signal.

Optionally, the communications system further includes a common channel. The common channel has a time-frequency resource different from a time-frequency resource of the dedicated channel. The common channel is detected by all terminal devices in the communications system.

The sending unit is further configured to: send indication information of the common channel by using a preset second time-frequency resource; and
send a common message by using the common channel; or
send indication information of a fourth time-frequency resource by using the common channel, and send a common message by using the fourth time-frequency resource, where the fourth time-frequency resource belongs to a time-frequency resource of the PDSCH.

The common message includes at least one of a random access response message, a paging message, or a system message.

Optionally, the common channel is a common enhanced downlink control channel EPDCCH.

Optionally, the dedicated channel is a dedicated EPDCCH.

Optionally, the time-frequency resource of the common channel includes the first K symbols in a same transmission time interval TTI, where K≥1.

Optionally, the time-frequency resource of the common channel belongs to M resource blocks RBs in a same TTI, where M≥1.

Optionally, the time-frequency resource of the common channel belongs to at least two resource blocks RBs.

Optionally, the at least two RBs to which the time-frequency resource of the common channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

Optionally, in the frequency domain, the time-frequency resource of the common channel is located at two ends of system bandwidth used by the communications system.

The scheduling information transmission apparatus 300 according to this embodiment of the present invention may be corresponding to the network device in the methods in the embodiments of the present invention. In addition, all units, that is, modules, of the information transmission apparatus 300 and the foregoing other operations and/or functions are separately for implementing the corresponding procedures of the method 100 in FIG. 2. For brevity, details are not described herein.

The scheduling information transmission apparatus in this embodiment of the present invention configures the at least two levels of dedicated channels, and when resource scheduling needs to be performed for the terminal device, sends indication information of the time-frequency resource of the level-one dedicated channel by using the first time-frequency resource used to transmit system information, so that indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

Furthermore, the common channel is configured, so that scheduling information transmission no longer depends on an existing PDCCH, and prior-art configuration of the PDCCH can be abandoned. Therefore, resource configuration flexibility can be further improved.

Figure 14:
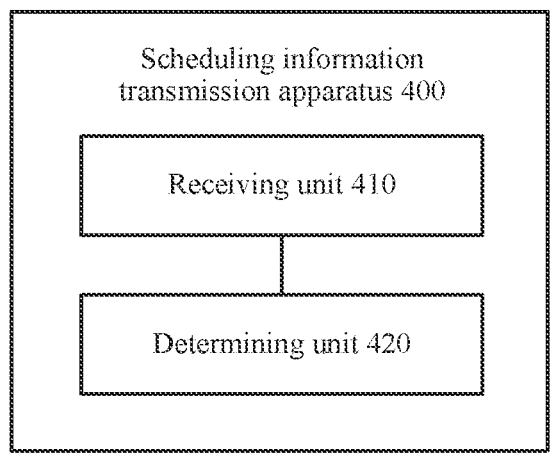
FIG. 14 is a schematic block diagram of a scheduling information transmission apparatus according to another embodiment of the present invention.

FIG. 14 is a schematic block diagram of a scheduling information transmission apparatus 400 according to an embodiment of the present invention. The apparatus 400 is configured in a communications system that includes at least two levels of dedicated channels used for downlink control. The dedicated channels at the levels are corresponding to different time-frequency resources. The dedicated channel is detected only by a terminal device to which the dedicated channel is allocated. As shown in FIG. 14, the apparatus 400 includes:

a receiving unit 410, configured to receive, by using a preset first time-frequency resource, indication information that is of the level-one dedicated channel and that is sent by a network device; and a determining unit 420, configured to determine the level-one dedicated channel according to the indication information of the level-one dedicated channel.

The receiving unit 410 is further configured to receive, by using the level-one dedicated channel, indication information that is of the level-two dedicated channel and that is sent by the network device.

Alternatively, the receiving unit 410 is further configured to: receive, by using the level-one dedicated channel, indication information that is of a third time-frequency resource and that is sent by the network device, and receive, by using the third time-frequency resource, indication information that is of the level-two dedicated channel and that is sent by the network device, where the third time-frequency resource belongs to a time-frequency resource of a physical downlink data channel PDSCH.

The determining unit 420 is further configured to determine the level-two dedicated channel according to the indication information of the level-two dedicated channel.

The receiving unit 410 is further configured to receive, by using the level-two dedicated channel, dedicated scheduling information that is sent by the network device and that is for the apparatus.

Optionally, a time-frequency resource of the level-one dedicated channel or a time-frequency resource of the level-two dedicated channel includes the first K symbols in a same transmission time interval TTI, where K≥1.

Optionally, the time-frequency resource of the level-one dedicated channel or the time-frequency resource of the level-two dedicated channel belongs to M resource blocks RBs in a same TTI, where M≥1.

Optionally, the level-one dedicated channel or the level-two dedicated channel is allocated by the network device according to a delay requirement of a service to be accessed by the apparatus.

Optionally, the time-frequency resource of the level-one dedicated channel belongs to at least two resource blocks RBs.

Optionally, the at least two RBs to which the time-frequency resource of the level-one dedicated channel belongs are discontinuous.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Optionally, in a frequency domain, the time-frequency resource of the level-one dedicated channel is located at two ends of preset bandwidth.

Optionally, the level-one dedicated channel or the level-two dedicated channel includes at least one channel element CE in a first TTI.

Optionally, the time-frequency resource of the level-one dedicated channel or the time-frequency resource of the level-two dedicated channel is configured in a centralized or distributed manner in the first TTI.

Distributed configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to at least two RBs in the first TTI; or when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to a same RB in the first TTI; or
 when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are continuous in the frequency domain.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first TTI, of a time-frequency resource that is in each CE of the level-two dedicated channel and that is used to transmit a reference signal.

Optionally, the communications system further includes a common channel. The common channel has a time-frequency resource different from a time-frequency resource of the dedicated channel. The common channel is detected by all terminal devices in the communications system.

The receiving unit is further configured to receive, by using a preset second time-frequency resource, indication information that is of the common channel and that is sent by the network device.

The determining unit is further configured to determine the common channel according to the indication information of the common channel.

The receiving unit is further configured to receive, by using the common channel, a common message sent by the network device.

Alternatively, the receiving unit is further configured to: receive, by using the common channel, indication information that is of a fourth time-frequency resource and that is sent by the network device, and receive, by using the fourth time-frequency resource, a common message sent by the network device, where the fourth time-frequency resource belongs to a time-frequency resource of the PDSCH.

The common message includes at least one of a random access response message, a paging message, or a system message.

Optionally, the common channel is a common enhanced downlink control channel EPDCCH.

Optionally, the dedicated channel is a dedicated EPDCCH.

Optionally, the time-frequency resource of the common channel includes the first K symbols in a same transmission time interval TTI, where K≥1.

Optionally, the time-frequency resource of the common channel belongs to M resource blocks RBs in a same TTI, where M≥1.

Optionally, the time-frequency resource of the common channel belongs to at least two resource blocks RBs.

Optionally, the at least two RBs to which the time-frequency resource of the common channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

The scheduling information transmission apparatus 400 according to this embodiment of the present invention may be corresponding to the terminal device in the methods in the embodiments of the present invention. In addition, all units, that is, modules, of the information transmission apparatus 400 and the foregoing other operations and/or functions are separately for implementing the corresponding procedures of the method 200 in FIG. 12. For brevity, details are not described herein.

The scheduling information transmission apparatus in this embodiment of the present invention configures the at least two levels of dedicated channels, and when resource scheduling needs to be performed for the terminal device, sends indication information of the time-frequency resource of the level-one dedicated channel by using the first time-frequency resource used to transmit system information, so that indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

Furthermore, the common channel is configured, so that scheduling information transmission no longer depends on an existing PDCCH, and prior-art configuration of the PDCCH can be abandoned. Therefore, resource configuration flexibility can be further improved.

The scheduling information transmission methods according to the embodiments of the present invention are described in detail above with reference to FIG. 1 to FIG. 12. Information transmission devices according to embodiments of the present invention are described in detail below with reference to FIG. 15 and FIG. 16.

Figure 15:
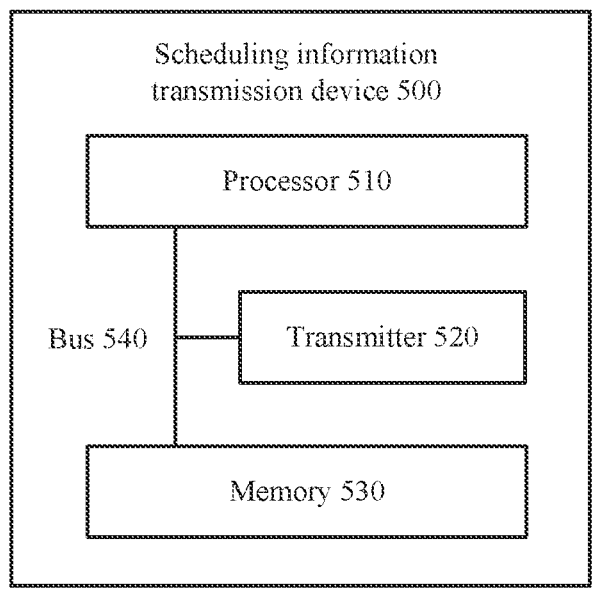
FIG. 15 is a schematic structural diagram of a scheduling information transmission device according to an embodiment of the present invention.

FIG. 15 is a schematic block diagram of a scheduling information transmission device 500 according to an embodiment of the present invention. As shown in FIG. 15, the device 500 includes: a processor 510 and a transmitter 520. The processor 510 is connected to the transmitter 520. Optionally, the device 500 further includes a memory 530. The memory 530 is connected to the processor 510. Optionally, the device 500 further includes a bus system 540. The processor 510, the memory 530, and the transmitter 520 may be connected by using the bus system 540. The memory 530 may be configured to store an instruction. The processor 510 is configured to execute the instruction stored in the memory 530, so as to control the transmitter 520 to send information or a signal. The device 500 is configured in a communications system that includes at least two levels of dedicated channels used for downlink control. The dedicated channels at the levels are corresponding to different time-frequency resources. The dedicated channel is detected only by a terminal device to which the dedicated channel is allocated.

The processor 510 executes the instruction, so as to allocate a level-one dedicated channel and a level-two dedicated channel to a target terminal device;
  control the transmitter 520 to send indication information of the level-one dedicated channel by using a preset first time-frequency resource;
  control the transmitter 520 to send indication information of the level-two dedicated channel to the target terminal device by using the level-one dedicated channel; or
  control the transmitter 520 to send indication information of a third time-frequency resource to the target terminal device by using the level-one dedicated channel, and send indication information of the level-two dedicated channel to the target terminal device by using the third time-frequency resource, where the third time-frequency resource belongs to a time-frequency resource of a physical downlink data channel PDSCH; and
  control the transmitter 520 to send dedicated scheduling information for the target terminal device to the target terminal device by using the level-two dedicated channel.

Optionally, a time-frequency resource of the level-one dedicated channel or a time-frequency resource of the level-two dedicated channel includes the first K symbols in a same transmission time interval TTI, where K≥1.

Optionally, the time-frequency resource of the level-one dedicated channel or the time-frequency resource of the level-two dedicated channel belongs to M resource blocks RBs in a same TTI, where M≥1.

Optionally, the processor is specifically configured to allocate the level-one dedicated channel and the level-two dedicated channel to the target terminal device according to a delay requirement of a service to be accessed by the target terminal device.

Optionally, the time-frequency resource of the level-one dedicated channel belongs to at least two resource blocks RBs.

Optionally, the at least two RBs to which the time-frequency resource of the level-one dedicated channel belongs are discontinuous.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Optionally, in a frequency domain, the time-frequency resource of the level-one dedicated channel is located at two ends of preset bandwidth.

Optionally, the level-one dedicated channel or the level-two dedicated channel includes at least one channel element CE in a first TTI.

Optionally, the time-frequency resource of the level-one dedicated channel or the time-frequency resource of the level-two dedicated channel is configured in a centralized or distributed manner in the first TTI.

Distributed configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to at least two RBs in the first TTI; or
  when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to a same RB in the first TTI; or
  when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are continuous in the frequency domain.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first TTI, of a time-frequency resource that is in each CE of the level-two dedicated channel and that is used to transmit a reference signal.

Optionally, the communications system further includes a common channel. The common channel has a time-frequency resource different from a time-frequency resource of the dedicated channel. The common channel is detected by all terminal devices in the communications system. The processor is further configured to: control the transmitter to send indication information of the common channel by using a preset second time-frequency resource; and
  control the transmitter to send a common message by using the common channel or control the transmitter to send indication information of a fourth time-frequency resource by using the common channel, and send a common message by using the fourth time-frequency resource, where the fourth time-frequency resource belongs to a time-frequency resource of the PDSCH.

The common message includes at least one of a random access response message, a paging message, or a system message.

Optionally, the common channel is a common enhanced physical downlink control channel EPDCCH.

Optionally, the dedicated channel is a dedicated EPDCCH.

Optionally, the time-frequency resource of the common channel includes the first K symbols in a same transmission time interval TTI, where K≥1.

Optionally, the time-frequency resource of the common channel belongs to NI resource blocks RBs in a same TTI, where M≥1.

Optionally, the time-frequency resource of the common channel belongs to at least two resource blocks RBs.

Optionally, the at least two RBs to which the time-frequency resource of the channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

Optionally, the device 500 is a base station, and the terminal device is user equipment.

It should be understood that in this embodiment of the present invention, the processor 510 may be a central processing unit (Central Processing Unit, "CPU" for short), or the processor 510 may be another general purpose processor, a digital signal processor (DSP), an application-specific integrated circuit (ASIC), a field programmable gate array (FPGA), another programmable logical device, a discrete gate, a transistor logical device, a discrete hardware component, or the like. The general purpose processor may be a microprocessor, or the processor may be any conventional processor, or the like.

The memory 530 may include a read-only memory and a random access memory, and provide an instruction and data for the processor 510. A part of the memory 530 may further include a non-volatile random access memory. For example, the memory 530 may further store information about a device type.

In addition to a data bus, the bus system 540 may include a power bus, a control bus, a status signal bus, and the like. However, for clarity of description, various buses are marked as the bus system 540 in the figure.

In an implementation process, each step of the foregoing methods may be completed by using an integrated logical circuit of hardware in the processor 510 or an instruction in a form of software. Steps of the methods disclosed with reference to the embodiments of the present invention may be directly performed and completed by a hardware processor, or may be performed and completed by using a combination of hardware and software modules in the processor. A software module may be located in a mature storage medium in the art such as a random access memory, a flash memory, a read-only memory, a programmable read-only memory, an electrically erasable programmable memory, or a register. The storage medium is located in the memory 530. The processor 510 reads information in the memory 530 and completes the steps of the foregoing methods in combination with the hardware of the processor. To avoid repetition, details are not described herein.

The scheduling information transmission device 500 according to this embodiment of the present invention may be corresponding to the network device in the methods in the embodiments of the present invention. In addition, all units, that is, modules, of the information transmission device 500 and the foregoing other operations and/or functions are separately for implementing the corresponding procedures of the method 100 in FIG. 2. For brevity, details are not described herein.

The scheduling information transmission device in this embodiment of the present invention configures the at least two levels of dedicated channels, and when resource scheduling needs to be performed for the terminal device, sends indication information of the time-frequency resource of the level-one dedicated channel by using the first time-frequency resource used to transmit system information, so that indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

Furthermore, the common channel is configured, so that scheduling information transmission no longer depends on an existing PDCCH, and prior-art configuration of the PDCCH can be abandoned. Therefore, resource configuration flexibility can be further improved.

Figure 16:
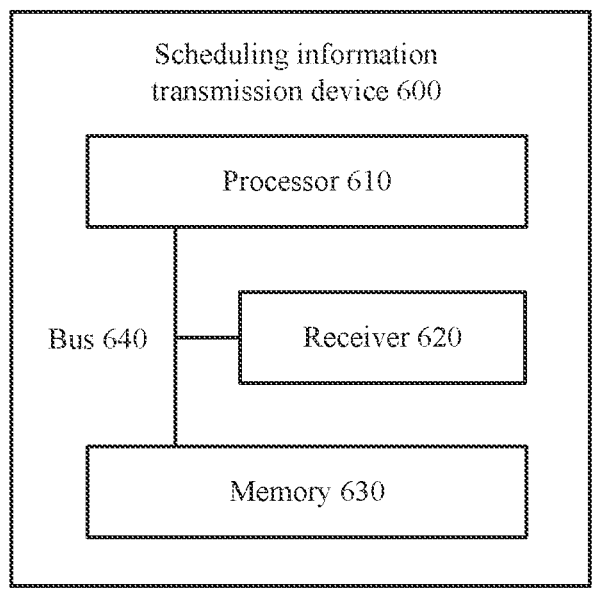
FIG. 16 is a schematic structural diagram of a scheduling information transmission device according to another embodiment of the present invention.

FIG. 16 is a schematic block diagram of a scheduling information transmission device 600 according to an embodiment of the present invention. As shown in FIG. 16, the device 600 includes: a processor 610 and a receiver 620. The processor 610 is connected to the receiver 620. Optionally, the device 600 further includes a memory 630. The memory 630 is connected to the processor 610. Optionally, the device 600 further includes a bus system 640. The processor 610, the memory 620, and the receiver 630 may be connected by using the bus system 640. The memory 630 may be configured to store an instruction. The processor 610 is configured to execute the instruction stored in the memory 630, so as to control the receiver 620 to send information or a signal. The device 600 is configured in a communications system that includes at least two levels of dedicated channels used for downlink control. The dedicated channels at the levels are corresponding to different time-frequency resources. The dedicated channel is detected only by a terminal device to which the dedicated channel is allocated.

The processor 610 executes the instruction, so as to control the receiver 620 to receive, by using a preset first time-frequency resource, indication information that is of the level-one dedicated channel and that is sent by a network device;

determine the level-one dedicated channel according to the indication information of the level-one dedicated channel;

control the receiver 620 to receive, by using the level-one dedicated channel, indication information that is of the level-two dedicated channel and that is sent by the network device; or control the receiver 620 to receive, by using the level-one dedicated channel, indication information that is of a third time-frequency resource and that is sent by the network device, and receive, by using the third time-frequency resource, indication information that is of the level-two dedicated channel and that is sent by the network device, where the third time-frequency resource belongs to a time-frequency resource of a physical downlink data channel PDSCH;

determine the level-two dedicated channel according to the indication information of the level-two dedicated channel; and control the receiver 620 to receive, by using the level-two dedicated channel, dedicated scheduling information that is sent by the network device and that is for the target terminal device.

Optionally, a time-frequency resource of the level-one dedicated channel or a time-frequency resource of the level-two dedicated channel includes the first K symbols in a same transmission time interval TTI, where K≥1.

Optionally, the time-frequency resource of the level-one dedicated channel or the time-frequency resource of the level-two dedicated channel belongs to M resource blocks RBs in a same TTI, where M≥1.

Optionally, the level-one dedicated channel or the level-two dedicated channel is allocated by the network device according to a delay requirement of a service to be accessed by the target terminal device.

Optionally, the time-frequency resource of the level-one dedicated channel belongs to at least two resource blocks RBs.

Optionally, the at least two RBs to which the time-frequency resource of the level-one dedicated channel belongs are discontinuous.

Optionally, the at least two RBs to which the time-frequency resource of the level-one dedicated channel belongs are continuous. A time-frequency resource that is of the level-one dedicated channel and that belongs to a first RB and a time-frequency resource that is of the level-one dedicated channel and that belongs to a second RB are discontinuous.

Optionally, in a frequency domain, the time-frequency resource of the level-one dedicated channel is located at two ends of preset bandwidth.

Optionally, the level-one dedicated channel or the level-two dedicated channel includes at least one channel element CE in a first TTI.

Optionally, the time-frequency resource of the level-one dedicated channel or the time-frequency resource of the level-two dedicated channel is configured in a centralized or distributed manner in the first TTI.

Distributed configuration means that when an RB that is in the first TTI and that is allocated to the level-one dedicated channel is used to carry only the level-one dedicated channel, or an RB that is in the first TIE and that is allocated to the level-two dedicated channel is used to carry only the level-two dedicated channel, a time-frequency resource of each CE belongs to at least two RBs in the first TTI; or when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are discontinuous in the frequency domain.

Centralized configuration means that when an RB that is in the first TTI and that is allocated to the level-one dedicated channel is used to carry only the level-one dedicated channel, or an RB that is in the first TTI and that is allocated to the level-two dedicated channel is used to carry only the level-two dedicated channel, a time-frequency resource of each CE belongs to a same RB in the first TTI; or when an RB that is in the first TTI and that is allocated to the level-one dedicated channel is used to carry the level-one dedicated channel and another channel, or an RB that is in the first TTI and that is allocated to the level-two dedicated channel is used to carry the level-two dedicated channel and another channel, resource elements REs included in each CE are continuous in the frequency domain.

Optionally, a first configuration pattern is the same as a second configuration pattern.

The first configuration pattern is a configuration pattern of a time-frequency resource that is in each CE of the level-one dedicated channel and that is used to transmit a reference signal.

The second configuration pattern is a configuration pattern of a time-frequency resource that is in each CE of the level-two dedicated channel and that is used to transmit a reference signal.

Optionally, a third configuration pattern is different from a fourth configuration pattern.

The third configuration pattern is a configuration pattern, used when the time-frequency resource of the level-two dedicated channel is configured in the centralized manner in the first TTI, of a time-frequency resource that is in each CE of the level-two dedicated channel and that is used to transmit a reference signal.

The fourth configuration pattern is a configuration pattern, used when the time-frequency resource of the level-two dedicated channel is configured in the distributed manner in the first of a time-frequency resource that is in each CE of the level-two dedicated channel and that is used to transmit a reference signal.

Optionally, the communications system further includes a common channel. The common channel has a time-frequency resource different from a time-frequency resource of the dedicated channel. The common channel is detected by all terminal devices in the communications system. The processor is further configured to: control the receiver to receive, by using a preset second time-frequency resource, indication information that is of the common channel and that is sent by the network device; and control the receiver to receive, by using the common channel, a common message sent by the network device; or control the receiver to receive, by using the common channel, indication information that is of a fourth time-frequency resource and that is sent by the network device, and receive, by using the fourth time-frequency resource, a common message sent by the network device, where the fourth time-frequency resource belongs to a time-frequency resource of the PDSCH.

The common message includes at least one of a random access response message, a paging message, or a system message.

Optionally, the common channel is a common enhanced downlink control channel EPDCCH.

Optionally, the dedicated channel is a dedicated EPDCCH.

Optionally, the time-frequency resource of the common channel includes the first K symbols in a same transmission time interval TTI, where K≥1.

Optionally, the time-frequency resource of the common channel belongs to M resource blocks RBs in a same where M≥1.

Optionally, the time-frequency resource of the common channel belongs to at least two resource blocks RBs.

Optionally, the at least two RBs to which the time-frequency resource of the common channel belongs are discontinuous.

Optionally, the at least two RBs to which the time-frequency resource of the common channel belongs are continuous. A time-frequency resource that is of the common channel and that belongs to a first RB and a time-frequency resource that is of the common channel and that belongs to a second RB are discontinuous.

Optionally, the device 600 is user equipment, and the network device is a base station.

It should be understood that in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA), another programmable logical device, a discrete gate, a transistor logical device, a discrete hardware component, or the like. The general purpose processor may be a microprocessor, or the processor may be any conventional processor, or the like.

The memory 630 may include a read-only memory and a random access memory, and provide an instruction and data for the processor 710. A part of the memory 630 may further include a non-volatile random access memory. For example, the memory 630 may further store information about a device type.

In addition to a data bus, the bus system 640 may include a power bus, a control bus, a status signal bus, and the like. However, for clarity of description, various buses are marked as the bus system 640 in the figure.

In an implementation process, each step of the foregoing methods may be completed by using an integrated logical circuit of hardware in the processor 610 or an instruction in a form of software. Steps of the methods disclosed with reference to the embodiments of the present invention may be directly performed and completed by a hardware processor, or may be performed and completed by using a combination of hardware and software modules in the processor. A software module may be located in a mature storage medium in the art such as a random access memory, a flash memory, a read-only memory, a programmable read-only memory, an electrically erasable programmable memory, or a register. The storage medium is located in the memory 630. The processor 610 reads information in the memory 630 and completes the steps of the foregoing methods in combination with the hardware of the processor. To avoid repetition, details are not described herein.

The scheduling information transmission device 600 according to this embodiment of the present invention may be corresponding to the terminal device in the methods in the embodiments of the present invention. In addition, all units, that is, modules, of the information transmission device 600 and the foregoing other operations and/or functions are separately for implementing the corresponding procedures of the method 200 in FIG. 12. For brevity, details are not described herein.

The scheduling information transmission device in this embodiment of the present invention configures the at least two levels of dedicated channels, and when resource scheduling needs to be performed for the terminal device, sends indication information of the time-frequency resource of the level-one dedicated channel by using the first time-frequency resource used to transmit system information, so that indication information of the time-frequency resource of the level-two dedicated channel is sent to the terminal device by using the level-one dedicated channel, and the dedicated scheduling information for the terminal device can be further sent by using the level-two dedicated channel. Therefore, in a process of transmitting the dedicated scheduling information, the time-frequency resource used to transmit the system information is occupied only when the indication information of the time-frequency resource of the level-one dedicated channel is sent, and after the terminal device learns of the time-frequency resource of the level-one dedicated channel, the dedicated scheduling information can be delivered at any time by using the level-one dedicated channel and the level-two dedicated channel. Therefore, scheduling information transmission flexibility can be improved, and system performance and user experience can be improved.

Furthermore, the common channel is configured, so that scheduling information transmission no longer depends on an existing PDCCH, and prior-art configuration of the PDCCH can be abandoned. Therefore, resource configuration flexibility can be further improved.

It should be noted that the embodiments of the present invention are described in detail with reference to a "resource block" above. In the embodiments of the present invention, the "resource block" may also be referred to as a resource unit (RU). In other words, in the embodiments of the present invention, the resource block may be one type of resource unit.

That is, by way of example, and not limitation, in the embodiments of the present invention, a resource unit may be, for example, a resource block. In addition, in the embodiments of the present invention, the resource block may be a time-frequency resource block. That is, the foregoing description is made by using an example in which the RB is used as the resource unit.

It should be noted that in the embodiments of the present invention, the resource unit may be a resource allocation unit, a resource scheduling unit, or a data transmission unit specified by a communications system or a communication protocol. By way of example, and not limitation, in the embodiments of the present invention, one resource unit occupies L symbols in a time domain and occupies N subcarriers in a frequency domain, where L≥1, and N≥1.

In addition, the embodiments of the present invention are described in detail with reference to a "TTI" above. The TTI is a basic transmission time unit (or a length of a transmission time period). That is, in the embodiments of the present invention, the III may be a time unit for one time of information transmission (or a time length for one time of information transmission), a time unit for one time of information scheduling (or a time length for one time of information scheduling), or a subframe length.

It should be noted that in the embodiments of the present invention, the time unit may be transmission duration corresponding to one transmission opportunity (for example, a transmission opportunity that is obtained based on a scheduling or contention mechanism).

Furthermore, the embodiments of the present invention are described with reference to a "channel element" above. The channel element may be a control channel element (Control Channel Element, CCE). That is, in the embodiments of the present invention, the level-one dedicated channel (specifically, the time-frequency resource of the level-one dedicated channel) or the level-two dedicated channel (specifically, the time-frequency resource of the level-two dedicated channel) may be divided on a basis of the control channel element CCE. In other words, the level-one dedicated channel may include at least one CCE in one TTI (that is, an example of the first TTI), and the level-two dedicated channel may include at least one CCE in one TTI (that is, an example of the first TTI).

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scheduling information transmission method, performed in a communications system that comprises at least two levels of channels used for downlink control, the method comprises:
    sending, by a network device on a first time-frequency resource, indication information of a level-one downlink control channel;
    sending, by the network device, indication information of a third time-frequency resource by using the level-one downlink control channel;
    sending, by the network device on the third time-frequency resource, indication information of a level-two downlink control channel to a terminal device, wherein the third time-frequency resource is a time-frequency resource of a physical downlink shared channel (PDSCH); and
    sending dedicated scheduling information for the terminal device to the terminal device by using the level-two downlink control channel; wherein
    the level-one downlink control channel or the level-two downlink control channel comprises at least two resource blocks, each of the at least two resource blocks includes twelve continuous subcarriers, wherein three non-continuous subcarriers in the twelve subcarriers in each of the at least two resource blocks carry reference signals, and at least one pair of two adjacent subcarriers in the three non-continuous subcarriers are separated by three continuous subcarriers in the twelve subcarriers.

2. The method according to claim 1, wherein a time-frequency resource of the level-one downlink control channel is detected by at least one terminal device including the terminal device.

3. The method according to claim 1, wherein the first time-frequency resource carries system information.

4. The method according to claim 1, wherein the three non-continuous subcarriers comprises a first subcarrier, a second subcarrier, and a third subcarrier, the first subcarrier and the second subcarrier are separated by three continuous subcarriers in the twelve subcarriers, and the second subcarrier and the third subcarrier are separated by another three continuous subcarriers in the twelve subcarriers.

5. A scheduling information receiving method, performed in a communications system that comprises at least two levels of channels used for downlink control, the method comprises:
   receiving, by a terminal device from a network device on a first time-frequency resource, indication information of a level-one downlink control channel;
   receiving, by the terminal device by using the level-one downlink control channel, from the network device, indication information of a third time-frequency resource;
   receiving, by the terminal device from the network device on the third time-frequency resource, indication information of a level-two downlink control channel, wherein the third time-frequency resource is a time-frequency resource of a physical downlink shared channel (PDSCH); and
   receiving, by the terminal device by using the level-two downlink control channel, from the network device, dedicated scheduling information for the terminal device, wherein
   the level-one downlink control channel or the level-two downlink control channel comprises at least two resource blocks, each of the at least two resource blocks includes twelve continuous subcarriers, wherein three non-continuous subcarriers in the twelve subcarriers in each of the at least two resource blocks carry reference signals, and at least one pair of two adjacent subcarriers in the three non-continuous subcarriers are separated by three continuous subcarriers in the twelve subcarriers.

6. The method according to claim 5, wherein a time-frequency resource of the level-one downlink control channel or a time-frequency resource of the level-two downlink control channel comprises first K symbols in a same transmission time interval (TTI), wherein K≥1.

7. The method according to claim 5, wherein the first time-frequency resource carries system information.

8. The method according to claim 5, wherein a time-frequency resource of the level-one downlink control channel belongs to at least two resource blocks; and
   the at least two resource blocks to which the time-frequency resource of the level-one downlink control channel belongs are discontinuous; or
   the at least two resource blocks to which the time-frequency resource of the level-one downlink control channel belongs are continuous, wherein a time-frequency resource that is of the level-one downlink control channel and that belongs to a first resource unit and a time-frequency resource that is of the level-one downlink control channel and that belongs to a second resource unit are discontinuous.

9. The method according to claim 5, wherein a time-frequency resource of the level-one downlink control channel is detected by at least one terminal device including the terminal device.

10. The method according to claim 5, wherein the level-one downlink control channel or the level-two downlink control channel comprises at least one control channel element in a first TTI, and the control channel element is used to carry downlink control information.

11. The method according to claim 10, wherein a first configuration pattern is the same as a second configuration pattern, wherein
   the first configuration pattern is a configuration pattern of a time-frequency resource that is in each control channel element of the level-one downlink control channel and that is used to transmit a reference signal; and
   the second configuration pattern is a configuration pattern of a time-frequency resource that is in each control channel element of the level-two downlink control channel and that is used to transmit a reference signal.

12. The method according to claim 5, wherein the three non-continuous subcarriers comprises a first subcarrier, a second subcarrier, and a third subcarrier, the first subcarrier and the second subcarrier are separated by three continuous subcarriers in the twelve subcarriers, and the second subcarrier and the third subcarrier are separated by another three continuous subcarriers in the twelve subcarriers.

13. A scheduling information transmission apparatus, configured in a communications system that comprises at least two levels of channels used for downlink control, the apparatus comprises:
   a memory configured to store a program code; and
   at least one processor in communication with the memory;
   wherein the program code, when executed by the at least one processor, causes the apparatus to:
   send indication information of a level-one downlink control channel on a first time-frequency resource;
   send indication information of a third time-frequency resource by using the level-one downlink control channel;
   send indication information of a level-two downlink control channel to a terminal device on the third time-frequency resource, wherein the third time-frequency resource is a time-frequency resource of a physical downlink shared channel (PDSCH); and
   send dedicated scheduling information for the terminal device to the terminal device by using the level-two downlink control channel, wherein
   the level-one downlink control channel or the level-two downlink control channel comprises at least two resource blocks, each of the at least two resource blocks includes twelve continuous subcarriers, wherein three non-continuous subcarriers in the twelve subcarriers in each of the at least two resource blocks are used for carrying reference signals, and at least one pair of two adjacent subcarriers in the three non-continuous subcarriers are separated by three continuous subcarriers in the twelve subcarriers.

14. The apparatus according to claim 13, wherein a time-frequency resource of the level-one downlink control channel or a time-frequency resource of the level-two downlink control channel comprises the K symbols in a same transmission time interval (TTI), wherein K≥1.

15. The apparatus according to claim 13, wherein the first time-frequency resource carries system information.

16. The apparatus according to claim 15, wherein a time-frequency resource of the level-one downlink control channel is detected by at least one terminal device.

17. The apparatus according to claim 13, wherein the three non-continuous subcarriers comprises a first subcarrier, a second subcarrier, and a third subcarrier, the first subcarrier and the second subcarrier are separated by three continuous subcarriers in the twelve subcarriers, and the second subcarrier and the third subcarrier are separated by another three continuous subcarriers in the twelve subcarriers.

18. A scheduling information receiving apparatus, configured in a communications system that comprises at least two levels of channels used for downlink control, the apparatus comprises:

a memory configured to store a program code; and at least one processor in communication with the memory;

wherein the program code, when executed by the at least one processor, causes the apparatus to:

receive, by using a first time-frequency resource, from a network device, indication information of a level-one downlink control channel;

receive, by using the level-one downlink control channel, from the network device, indication information of a third time-frequency resource;

receive, by using the third time-frequency resource, from the network device, indication information of a level-two downlink control channel, wherein the third time-frequency resource is a time-frequency resource of a physical downlink shared channel (PDSCH); and receive, by using the level-two downlink control channel, from the network device, dedicated scheduling information, wherein the level-one downlink control channel or the level-two downlink control channel comprises at least two resource blocks, each of the at least two resource blocks includes twelve continuous subcarriers, wherein three non-continuous subcarriers in the twelve subcarriers in each of the at least two resource blocks carry reference signals, and at least one pair of two adjacent subcarriers in the three non-continuous subcarriers are separated by three continuous subcarriers in the twelve subcarriers.

19. The apparatus according to claim 18, wherein a time-frequency resource of the level-one downlink control channel is detected by at least one terminal device.

20. The apparatus according to claim 18, wherein the first time-frequency resource carries system information.

21. The apparatus according to claim 18, wherein the three non-continuous subcarriers comprises a first subcarrier, a second subcarrier, and a third subcarrier, the first subcarrier and the second subcarrier are separated by three continuous subcarriers in the twelve subcarriers, and the second subcarrier and the third subcarrier are separated by another three continuous subcarriers in the twelve subcarriers.

* * * * *